US012380805B2

(12) United States Patent
Kimata et al.

(10) Patent No.: US 12,380,805 B2
(45) Date of Patent: Aug. 5, 2025

(54) TRAFFIC SAFETY SUPPORT SYSTEM AND STORAGE MEDIUM

(71) Applicants: HONDA MOTOR CO., LTD., Tokyo (JP); Honda Research Institute Europe GmbH, Offenbach/Main (DE)

(72) Inventors: Akihito Kimata, Saitama (JP); Ryohei Hirano, Saitama (JP); Tim Puphal, Offenbach/Main (DE)

(73) Assignees: HONDA MOTOR CO., LTD., Tokyo (JP); Honda Research Institute Europe GmbH, Offenbach/Main (DE)

( * ) Notice: Subject to any disclaimer, the term of this patent is extended or adjusted under 35 U.S.C. 154(b) by 345 days.

(21) Appl. No.: 17/936,856

(22) Filed: Sep. 30, 2022

(65) Prior Publication Data

US 2024/0112580 A1    Apr. 4, 2024

(51) Int. Cl.
*G08G 1/16* (2006.01)
*B60W 30/09* (2012.01)
(Continued)

(52) U.S. Cl.
CPC ............ *G08G 1/164* (2013.01); *B60W 30/09* (2013.01); *B60W 50/14* (2013.01);
(Continued)

(58) Field of Classification Search
CPC .... G08G 1/164; G08G 1/0112; G08G 1/0116; G08G 1/0125; G08G 1/0145;
(Continued)

(56) References Cited

U.S. PATENT DOCUMENTS

| 2013/0033368 | A1* | 2/2013 | Fukamachi | ............ G08G 1/165 340/425.5 |
| 2015/0344030 | A1 | 12/2015 | Damerow et al. | |
| 2017/0131719 | A1* | 5/2017 | Micks | .................. G05D 1/0246 |
| 2017/0186319 | A1 | 6/2017 | Tsushima et al. | |

(Continued)

FOREIGN PATENT DOCUMENTS

| JP | 2010105553 A | 5/2010 |
| JP | 2011118723 A | 6/2011 |

(Continued)

OTHER PUBLICATIONS

Notification of Reasons for Refusal issued Nov. 19, 2024 in the JP Patent Application No. 2023-168765.

*Primary Examiner* — James J Lee
*Assistant Examiner* — Alexander George Matta
(74) *Attorney, Agent, or Firm* — CKC & Partners Co., LLC

(57) ABSTRACT

A predictor 62 of a traffic safety support system includes a movement state information acquirer 620 configured to acquire movement state information of the prediction target, a surrounding state information acquirer 621 configured to acquire surrounding state information, a first movement state predictor 624 configured to predict a first predicted movement state on the basis of the movement state information, a second movement state predictor 625 configured to predict a second predicted movement state on the basis of the driver state information, a collision risk calculator 626 configured to calculate a first collision risk value for the first predicted movement state and a second collision risk value for the second predicted movement state, and a support controller 65 configured to execute support control for the prediction target in a case where at least one of the first and second collision risk values is greater than a predetermined threshold value.

10 Claims, 14 Drawing Sheets

(51) Int. Cl.
  *B60W 50/14*  (2020.01)
  *G08G 1/01*  (2006.01)
  *G08G 1/052*  (2006.01)

(52) U.S. Cl.
  CPC .......... *G08G 1/0112* (2013.01); *G08G 1/0116* (2013.01); *G08G 1/0125* (2013.01); *G08G 1/0145* (2013.01); *G08G 1/052* (2013.01); *G08G 1/166* (2013.01); *B60W 2050/146* (2013.01); *B60W 2556/45* (2020.02)

(58) Field of Classification Search
  CPC .......... G08G 1/052; G08G 1/166; G08G 1/04; G08G 1/16; G08G 1/0137; B60W 30/09; B60W 50/14; B60W 2050/146; B60W 2556/45
  See application file for complete search history.

(56) References Cited

U.S. PATENT DOCUMENTS

| | | | |
|---|---|---|---|
| 2018/0322715 A1* | 11/2018 | Toyoda | G02B 27/0101 |
| 2019/0118834 A1 | 4/2019 | Wiebel-Herboth et al. | |
| 2021/0276588 A1* | 9/2021 | Kabzan | B60W 10/04 |
| 2021/0350703 A1* | 11/2021 | Mackenzie | G06T 7/70 |
| 2023/0093047 A1* | 3/2023 | Mizoguchi | G05D 1/0297 |
| | | | 701/24 |
| 2024/0053161 A1* | 2/2024 | Grubwinkler | G08G 1/052 |

FOREIGN PATENT DOCUMENTS

| | | |
|---|---|---|
| JP | 2015228204 A | 12/2015 |
| JP | 2019091432 A | 6/2019 |
| WO | 2016092591 A1 | 6/2016 |
| WO | 2019198449 A1 | 10/2019 |

\* cited by examiner

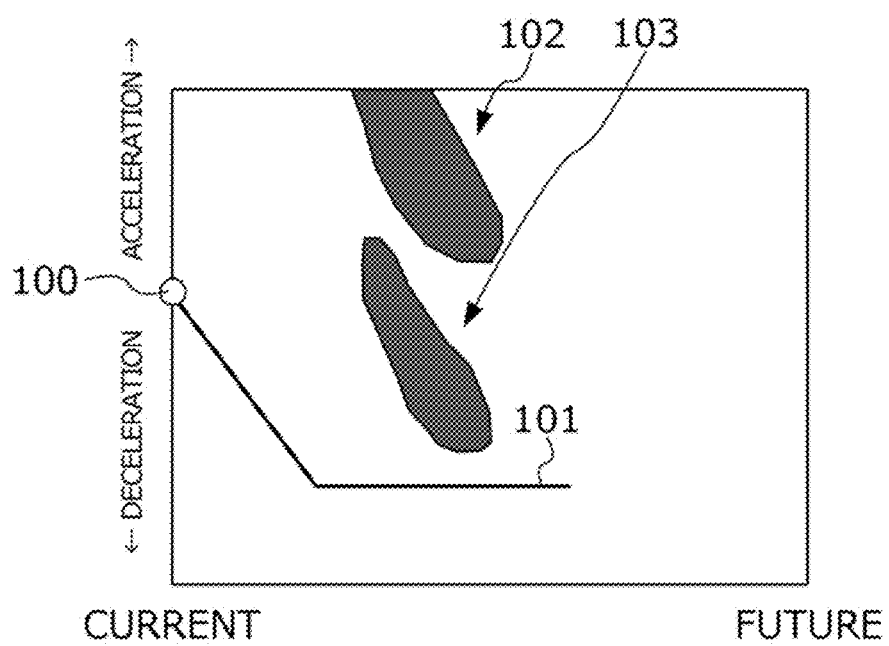

TRAFFIC SAFETY SUPPORT SYSTEM AND STORAGE MEDIUM

BACKGROUND OF THE INVENTION

Field of the Invention

The present invention relates to a traffic safety support system, and a storage medium. More specifically, the present invention relates to a traffic safety support system that supports safe movement of traffic participants as persons or moving bodies, and a storage medium.

Related Art

In public traffic, various traffic participants such as moving bodies including four-wheeled vehicles, motorcycles, bicycles, and the like, and pedestrians move at different speeds on the basis of individual intentions. As a technique for improving safety, convenience, and the like, of traffic participants in such public traffic, for example, Patent Document 1 discloses a traveling safety device that supports safe driving by a driver of a vehicle.

A collision avoidance device disclosed in Patent Document 1 predicts acceleration when a vehicle starts based on a result of determination of a haste degree when the vehicle temporarily stops at an intersection, and further predicts a possibility of a collision after the vehicle starts based on this acceleration. The collision avoidance device also provides a notification to avoid the collision when it predicts that there is a possibility of a collision.

Patent Document 1: Japanese Unexamined Patent Application, Publication No. 2011-118723

SUMMARY OF THE INVENTION

By the way, in general, in order to predict a collision possibility in a vehicle's future, it is necessary to predict the future behavior of vehicle with a high degree of accuracy. However, in many cases, there are numerous patterns of future behavior of a running vehicle. Therefore, it is time-consuming to narrow down the most likely behavior patterns from among numerous possible future behavior patterns of the vehicle. In addition, in order to avoid collision, it is necessary to start support control as quickly as possible. However, this required narrowing down the most plausible behavior patterns in a short period time, which in turn increases processing load.

The present invention is directed to providing a traffic safety support system capable of starting support control with a margin under small processing load, and a storage medium.

(1) A traffic safety support system according to the present invention supporting, when a moving body moving in a traffic area is defined, as a prediction target, safe traffic of the prediction target in the traffic area, includes a movement state information acquirer configured to acquire movement state information regarding a movement state of the prediction target, a surrounding state information acquirer configured to acquire surrounding state information regarding movement states of surrounding traffic participants around the prediction target in the traffic area, a driver state information acquirer configured to acquire driver state information regarding a state of a driver of the prediction target, a first movement state predictor configured to predict a first predicted movement state of the prediction target on a basis of the movement state information, a second movement state predictor configured to predict a second predicted movement state of the prediction target on the basis of the driver state information, a collision risk calculator configured to calculate a first collision risk value between the prediction target and the surrounding participants in the first predicted movement state and a second collision risk value between the prediction target and the surrounding participants in the second predicted movement state on the basis of the surrounding state information, and a support controller configured to execute support control for the prediction target in a case where at least one of the first collision risk value and the second collision risk value is greater than a predetermined threshold value.

(2) In this case, the support controller preferably executes the support control to cause the prediction target to perform a first avoidance action to achieve the first predicted movement state when the first collision risk value is less than or equal to the threshold value and the second collision risk value is greater than the threshold value, executes the support control to cause the prediction target to perform a second avoidance action to achieve the second predicted movement state when the second collision risk value is less than or equal to the threshold value and the first collision risk value is greater than the threshold value, and executes the support control to cause the prediction target to perform a collision avoidance action to avoid a collision with the surrounding traffic participants or a collision damage reduction action to reduce damage from the collision when both the first collision risk value and the second collision risk value are greater than the threshold value.

(3) In this case, the collision risk calculator preferably calculates the first collision risk value by searching a risk map that relates moving speed of the prediction target to a collision risk value of the prediction target in a future, on the basis of a first predicted moving speed profile according to the first predicted movement state, and calculates the second collision risk value by searching the risk map on the basis of a second predicted moving speed profile according to the second predicted movement state.

(4) In this case, the traffic safety support system preferably includes on-board devices that move along with the prediction target, and a traffic management server capable of communicating with the on-board devices. The traffic management server preferably includes the movement state information acquirer, the surrounding state information acquirer, the driver state information acquirer, the first movement state predictor, the second movement state predictor, the collision risk calculator, and the support controller. The on-board devices preferably include an on-board notification device configured to notify the driver of information by at least one selected from an image and sound. The support controller executes, as the support control, notification control that notifies the driver of information to avoid the collision of the prediction target or to reduce damage from the collision by operating the on-board notification device.

(5) In this case, the support controller, in the notification control, preferably notifies the driver of information to encourage acceleration or deceleration in accordance with the first avoidance action, the second avoidance action, the collision avoidance action, or the collision damage reduction action.

(6) In this case, the support controller, in the notification control, preferably displays an image generated by plotting a moving speed profile on the risk map according to the first avoidance action, the second avoidance action, the collision avoidance action, or the collision damage reduction action on the on-board notification device.

(7) In this case, the support controller preferably displays the risk map on the on-board notification device by highlighting areas on the risk map where the collision risk value is greater than the threshold value.

(8) in this case, the driver state information acquirer preferably acquires information regarding a surrounding confirmation state of the driver as the driver state information, and the second movement state predictor predicts the second predicted movement state on the basis of the movement state information, the surrounding state information, and the driver state information.

(9) In this case, the traffic safety support system preferably includes a traffic environment information acquirer configured to acquire traffic environment information around the prediction target in the traffic area. The second movement state predictor preferably includes a traffic scene specifier configured to specify a traffic scene of the prediction target on a basis of the movement state information, the surrounding state information, and the traffic environment information, an action pattern selector configured to select, as a predicted action pattern, at least one from among a plurality of predetermined action patterns on the basis of the traffic scene and the driver state information, and an action predictor configured to predict the second predicted movement state on the basis of the predicted action pattern.

(10) In this case, the traffic safety support system preferably includes on-board devices that move along with the prediction target, and a traffic management server capable of communicating with the on-board devices. The traffic management server preferably includes the movement state information acquirer, the surrounding state information acquirer, the driver state information acquirer, the first movement state predictor, the second movement state predictor, the collision risk calculator, and the support controller. The on-board devices preferably include an on-board driving support device configured to automatically control behavior of the prediction target. The support controller preferably executes, as the support control, automatic behavior control that operates the on-board driving support device to avoid a collision of the prediction target or to reduce damage from collision.

(1) In a traffic safety support system, a movement state information acquirer acquires movement state information regarding a movement state of the prediction target, a surrounding state information acquirer acquires surrounding state information regarding a movement state of surrounding traffic participants around the prediction target in the traffic area, and a driver state information acquirer acquires driver state information regarding a state of a driver of the prediction target. A first movement state predictor predicts a first predicted movement state of the prediction target on the basis of the movement state information, a second movement state predictor predicts a second predicted movement state of the prediction target on the basis of the driver state information, and the collision risk calculator calculates a first collision risk value between the prediction target and the surrounding participants in the first predicted movement state and a second collision risk value between the prediction target and the surrounding participants in the second predicted movement state on the basis of the surrounding state information. In addition, a support controller executes support control for the prediction target in a case where at least one of the first collision risk value and the second collision risk value is greater than a threshold value. In other words, in the present invention, the support controller predicts the predicted movement state corresponding to a future behavior of the prediction target by two different algorithms, and when at least one of these prediction results is predicted to cause a collision with the surrounding traffic participants, the support control is initiated. Thus, according to the present invention, the support control can be initiated without narrowing down the future behavior pattern of the prediction target, which reduces processing load and accelerates timing for initiating the support control.

(2) The support controller executes the support control to cause the prediction target to perform a first avoidance action to achieve the first predicted movement state when the first collision risk value is less than or equal to the threshold value and the second collision risk value is greater than the threshold value, and executes the support control to cause the prediction target to perform a second avoidance action to achieve the second predicted movement state when the second collision risk value is less than or equal to the threshold value and the first collision risk value is greater than the threshold value. The support controller can promptly initiate the support control by executing the support control so that the prediction target performs avoidance action that realizes a predicted movement state that is already known in advance to have low collision risk as described above. Additionally, in the case where both the first and second collision risk values are greater than the threshold values, the support controller executes the support control so that the prediction target performs a collision avoidance action or a collision damage reduction action. This enables the prediction target to avoid the collision or mitigate damage caused by the collision even in the case where both the first and second collision risk values are greater than the threshold value.

(3) The collision risk calculator can promptly calculate the collision risk values by calculating the first and second risk values by using a risk map that relates moving speed of the prediction target to future collision risk values of the prediction target. According to the present invention, by shortening time required to calculate the collision risk values, timing to start the support control can be accelerated.

(4) A traffic safety support system includes on-board devices that move along with the prediction target in the traffic area, and a traffic management server capable of communicating with the on-board devices. The above-mentioned movement state information acquirer, the surrounding state information acquirer, the first movement state predictor, the second movement state predictor, the collision risk calculator, and the support controller are configured in the traffic management server. Thus, according to the present invention, the traffic management server can collect information such as the movement state information, the surrounding state information, and the driver state information of the prediction target, thereby enabling accurate prediction of a future collision risk of the prediction target. In addition, the support controller of the traffic management server executes, as the support control, notification control that notifies the driver of information to avoid a collision of the prediction target or to mitigate damage caused by the collision by operating the on-board notification device of the on-board devices. Thus, according to the present invention, the driver of the predicted target who receives the notification can take an action to avoid the predicted collision or mitigate damage caused by the collision.

(5) In the above notification control, the support controller notifies the driver of information to encourage acceleration or deceleration according to the first avoidance action, the second avoidance action, the collision avoidance action, or the collision damage reduction action. Thus, according to the present invention, the driver of the prediction target can avoid the predicted collision or reduce damage caused by the collision by accelerating or decelerating in accordance with the notification.

(6) In the above notification control, the support controller displays on-board notification device an image generated by plotting a moving speed profile on a risk map according to the first avoidance action, the second avoidance action, the collision avoidance action, or the collision damage reduction action. Thus, according to the present invention, the driver of the predicted target can easily recognize existence of the risk and the moving speed profile to avoid this risk by viewing the image displayed by the on-board notification device.

(7) In the present invention, when the support controller displays the image of the risk map on the on-board notification device on the basis of the notification control, the support controller highlights areas on the risk map where the collision risk value is larger than the threshold value and displays them on the on-board notification device. Thus, according to the present invention, the driver of the prediction target can promptly recognize existence of the risk by viewing the image displayed by the on-board notification device.

(8) In the present invention, the driver state information acquirer acquires information regarding a surrounding confirmation state of the driver as driver state information, and the second movement state predictor predicts the second predicted movement state on the basis of the movement state information, the surrounding state information, and the driver state information. Therefore, according to the present invention, the second predicted movement state can be predicted by reflecting the surrounding confirmation state of the driver, and the future collision risk can be predicted with high accuracy.

(9) In the present invention, the second movement state predictor includes a traffic scene specifier configured to specify a traffic scene of the prediction target on a basis of the movement state information, the surrounding state information, and the traffic environment information, an action pattern selector configured to select, as a predicted action pattern, at least one from among a plurality of predetermined action patterns on the basis of the traffic scene and the driver state information, and an action predictor configured to predict future action of the prediction target on the basis of the predicted action pattern. Thus, according to the present invention, the predicted action pattern can be efficiently narrowed down from among the plurality of action patterns while reflecting the state of the driver, by using the traffic scene in which the prediction target is placed and the driver state information of the driver of the prediction target. Thus, according to the present invention, the second predicted movement state can be predicted with reduced calculation load, while reflecting the state of the driver, and the future collision risk can be predicted with high accuracy.

(10) A traffic safety support system includes on-board devices that move along with the prediction target in the traffic area, and a traffic management server capable of communicating with the on-board devices. The above-mentioned movement state information acquirer, the surrounding state information acquirer, the driver state information acquirer, the first movement state predictor, the second movement state predictor, the collision risk calculator, and the support controller are configured in the traffic management server. Thus, according to the present invention, the traffic management server can collect information such as the movement state information, the surrounding state information, and the driver state information of the prediction target, thereby enabling accurate prediction of a future collision risk of the prediction target. In addition, the support controller of the traffic management server executes, as a support control, an automatic behavior control that operates the on-board driving support device to avoid collision of the prediction target or to reduce damage from collision. Thus, according to the present invention, the traffic management server can automatically control the behavior of the prediction target via the automatic behavior control, and the predicted collision can be automatically avoided or the damage caused by the collision can be mitigated.

BRIEF DESCRIPTION OF THE DRAWINGS

FIG. 9 is an example of an image displayed by an on-board notification device on the basis of notification control by a support controller;

DETAILED DESCRIPTION OF THE INVENTION

First Embodiment

A traffic safety support system according to a first embodiment of the present invention will be described below with reference to the drawings.

Figure 1:
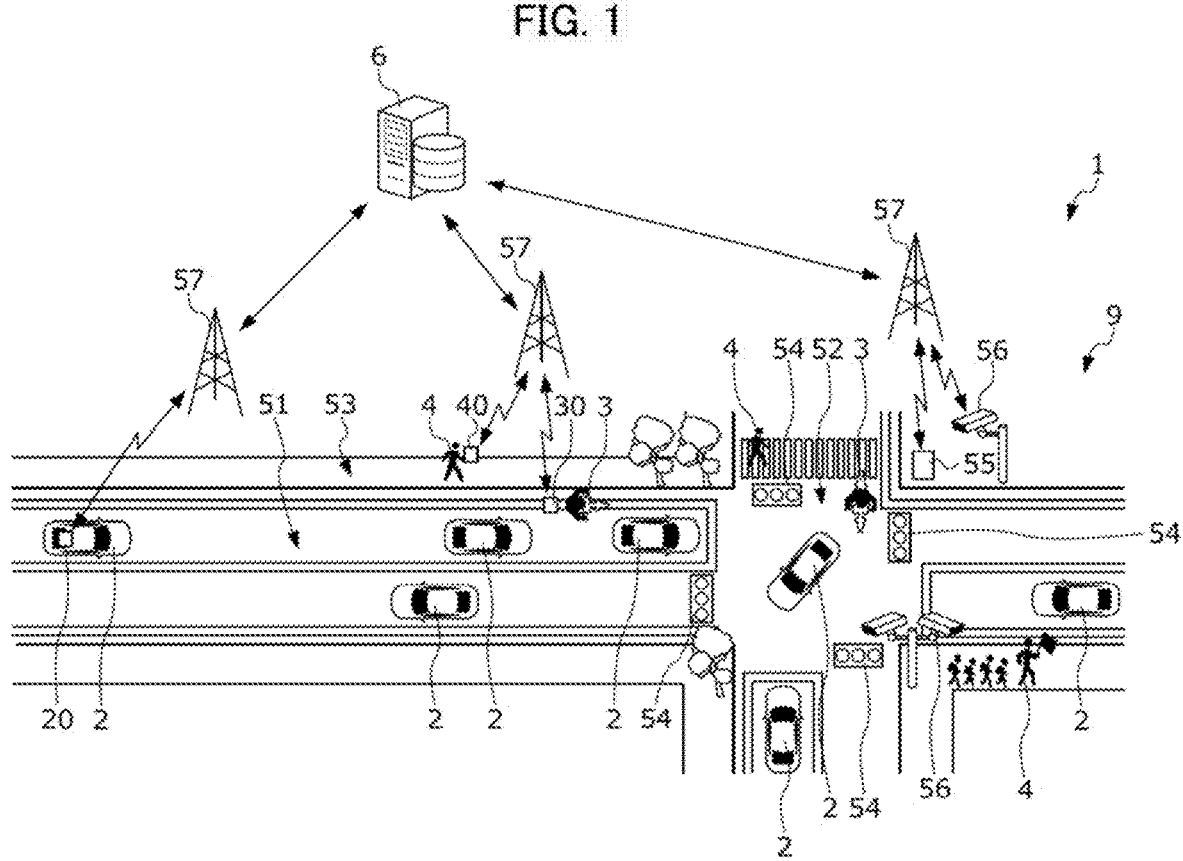
FIG. 1 is a view illustrating a configuration of a traffic safety support system according to a first embodiment of the present invention and part of a target traffic area to be supported by the traffic safety support system.

FIG. 1 is a view schematically illustrating a configuration of a traffic safety support system 1 according to the present embodiment and part of a target traffic area 9 in which traffic participants to be supported by the traffic safety support system 1 exist.

The traffic safety support system 1 supports safe and smooth traffic of traffic participants in the target traffic area 9 by recognizing, as individual traffic participants, pedestrians 4 who are persons moving in the target traffic area 9 and four-wheeled vehicles 2, motorcycles 3, and the like that are moving bodies moving in the target traffic area 9, and notifying each traffic participant of support information generated through the recognition to encourage communication (specifically, for example, reciprocal recognition between the traffic participants) between the traffic participants that move on the basis of intentions of the traffic participants and recognition of a surrounding traffic environment and to automatically control behavior of the moving bodies.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided.

The traffic safety support system 1 includes on-board devices 20 (including on-board devices mounted on individual four-wheeled vehicles 2 and mobile information processing terminals possessed or worn by drivers who drive the individual four-wheeled vehicles 2) that move along with the individual four-wheeled vehicles 2, on-board devices 30 (including on-board devices mounted on individual motorcycles 3 and mobile information processing terminals possessed or worn by drivers who drive the individual motorcycles 3) that move along with the individual motorcycles 3, mobile information processing terminals 40 possessed or worn by the respective pedestrians 4, a plurality of the infrastructure cameras 56 provided in the target traffic area 9, a traffic light control device 55 that controls the traffic lights 54, and a traffic management server 6 connected to a plurality of terminals (hereinafter, also simply referred to as "area terminals") such as these on-board devices 20 and 30, the mobile information processing terminals 40, the infrastructure cameras 56 and the traffic light control device 55 existing in the target traffic area 9 so as to be able to perform communication.

The traffic management server 6 includes one or more computers connected to the above-described plurality of area terminals via base stations 57 so as to be able to perform communication. More specifically, the traffic management server 6 includes a server connected to the plurality of area terminals via the base stations 57, a network core and the Internet, an edge server connected to the plurality of area terminals via the base stations 57 and an MEC (multi-access edge computing) core, and the like.

Figure 2:
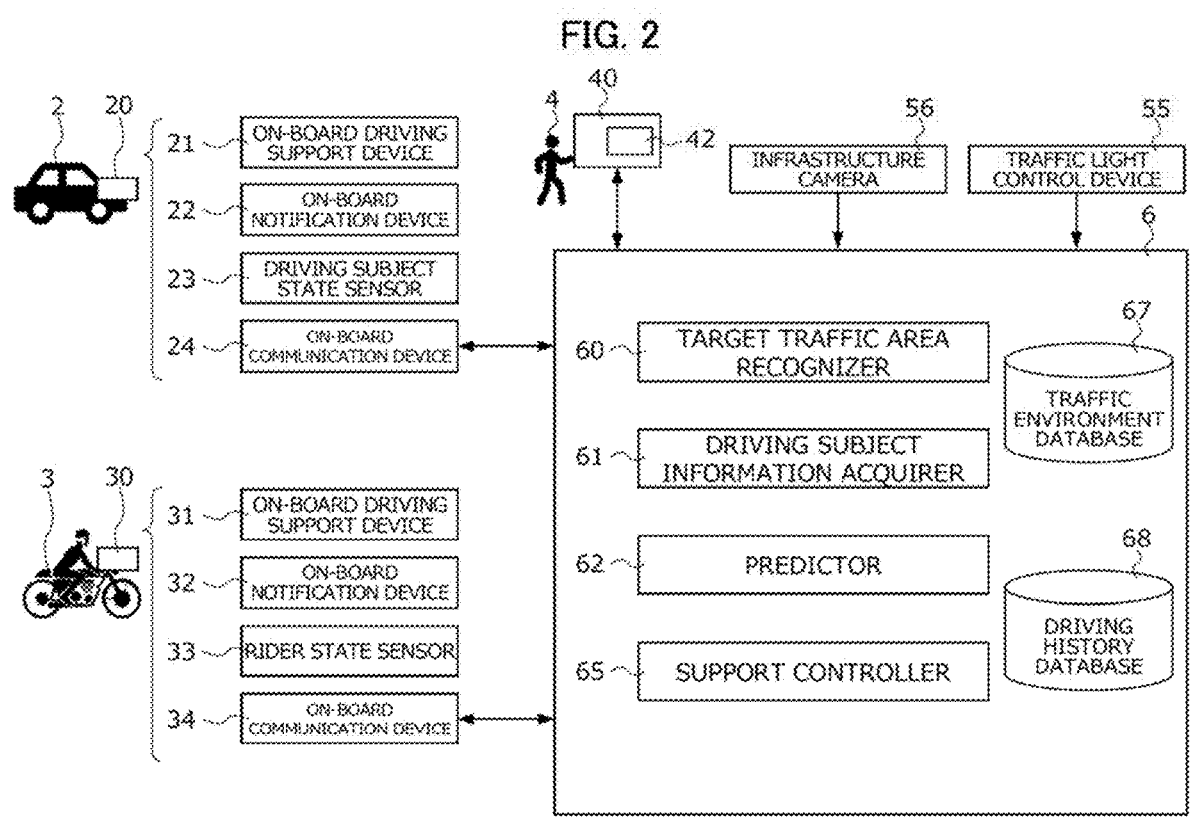
FIG. 2 is a block diagram illustrating a configuration of a traffic management server and a plurality of area terminals connected to the traffic management server so as to be able to perform communication.

FIG. 2 is a block diagram illustrating a configuration of the traffic management server 6 and a plurality of area terminals connected to the traffic management server 6 so as to be able to perform communication.

The on-board devices 20 mounted on the four-wheeled vehicle 2 in the target traffic area 9 include, for example, an on-board driving support device 21 that supports driving by a driver, an on-board notification device 22 that notifies the driver of various kinds of information, a driving subject state sensor 23 that detects a state of the driver who is driving, an on-board communication device 24 that performs wireless communication between the own vehicle, and the traffic management server 6 and other vehicles near the own vehicle, and the like.

The on-board driving support device 21 includes an external sensor unit, an own vehicle state sensor, a navigation device, a driving support ECU, and the like. The external sensor includes an exterior camera unit that captures an image around the own vehicle, a plurality of on-board external sensors mounted on the own vehicle, such as a radar unit and a LIDAR (light detection and ranging) unit that detects a target outside the vehicle using an electromagnetic wave, and an outside recognition device that acquires information regarding a state around the own vehicle by performing sensor fusion processing on detection results by these on-board external sensors. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS (global navigation satellite system) receiver that specifies a current position of the own vehicle on the basis of a signal received from a GNSS satellite, a storage device that stores map information, and the like.

The driving support ECU executes driving support control that automatically controls behavior of the vehicle, such as lane departure prevention control, lane change control, preceding vehicle following control, erroneous start prevention control, collision mitigation brake control, and collision avoidance control on the basis of the information acquired by an on-board sensing device such as the external sensor unit, the own vehicle state sensor, and the navigation device and coordination support information transmitted from the traffic management server 6. Further, the driving support ECU generates driving support information for supporting safe driving by the driver on the basis of the information acquired by the external sensor unit, the own vehicle state sensor, the navigation device, and the like, and transmits the driving support information to the on-board notification device 22.

The driving subject state sensor 23 includes various devices that acquire time-series data of information correlated with driving capability of the driver who is driving. The driving subject state sensor 23 includes, for example, an on-board camera that acquires face image data of the driver who is driving, a biological information sensor that acquires biological information of the driver who is driving, and the like. Here, the biological information sensor more specifically includes a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and a wearable terminal that detects a heart rate, a blood pressure, a degree of saturation of oxygen in blood, and the like.

The on-board communication device 24 has a function of transmitting, to the traffic management server 6, the information acquired by the driving support ECU (including the information acquired by the external sensor unit, the own vehicle state sensor, the navigation device, and the like, control information regarding driving support control that is being executed, and the like), the information regarding the driving subject acquired by the driving subject state sensor 23 (the face image data and the biological information of the driver), and the like, and a function of receiving coordination support information transmitted from the traffic management server 6 and transmitting the received coordination support information to the on-board driving support device 21 and the on-board notification device 22.

The on-board notification device 22 includes various devices that notify the driver of various kinds of information through auditory sense, visual sense, haptic sense, and the like, by causing a human machine interface (hereinafter, may be abbreviated as an "HMI") to operate in an aspect determined on the basis of the driving support information transmitted from the on-board driving support device 21 and the coordination support information transmitted from the traffic management server 6.

The on-board devices 30 mounted on the motorcycle 3 in the target traffic area 9 include, for example, an on-board driving support device 31 that supports driving by a rider, an on-board notification device 32 that notifies the rider of various kinds of information, a rider state sensor 33 that detects a state of the rider who is driving, an on-board communication device 34 that performs wireless communication between the own vehicle, and the traffic management server 6 and other vehicles near the own vehicle, and the like.

The on-board driving support device 31 includes an external sensor unit, an own vehicle state sensor, a navigation device, a driving support ECU, and the like. The external sensor unit includes an exterior camera unit that captures an image around the own vehicle, a plurality of on-board external sensors mounted on the own vehicle such as a radar unit and a LIDAR unit that detects a target outside the vehicle by using an electromagnetic wave, and an outside recognition device that acquires information regarding a state around the own vehicle by performing sensor fusion processing on detection results by the on-board exterior sensors. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control that automatically controls behavior of the vehicle, such as lane keeping control, lane departure prevention control, lane change control, preceding vehicle following control, erroneous start prevention control, and collision mitigation brake control on the basis of the information acquired by an on-board sensing device such as the external sensor unit, the own vehicle state sensor, and the navigation device and coordination support information transmitted from the traffic management server 6. Further, the driving support ECU generates driving support information for supporting safe driving by the rider on the basis of the information acquired by the external sensor unit, the own vehicle state sensor, the navigation device, and the like, and transmits the driving support information to the on-board notification device 32.

The rider state sensor 33 includes various devices that acquire information correlated with driving capability of the rider who is driving. The rider state sensor 33 includes, for example, an on-board camera that acquires face image data of the rider who is driving, a biological information sensor that acquires biological information of the rider who is driving, and the like. Here, the biological information sensor more specifically includes a seat sensor that is provided at a seat to be seated by the rider and detects a pulse of the rider, whether or not the rider breathes, and the like, a helmet sensor that is provided at a helmet to be worn by the rider and detects a pulse of the rider, whether or not the rider breathes, a skin potential of the rider, and the like, and a wearable terminal that detects a heart rate, a blood pressure, a degree of saturation of oxygen in blood, and the like.

The on-board communication device 34 has a function of transmitting, to the traffic management server 6, the information acquired by the driving support ECU (including the information acquired by the external sensor unit, the own vehicle state sensor, the navigation device, and the like, control information regarding driving support control that is being executed, and the like), the information regarding the rider acquired by the rider state sensor 33 (the face image data and the biological information of the rider), and the like, and a function of receiving coordination support information transmitted from the traffic management server 6 and transmitting the received coordination support information to the on-board driving support device 31 and the on-board notification device 32.

The on-board notification device 32 includes various devices that notify the rider of various kinds of information through auditory sense, visual sense, haptic sense, and the like of the rider, by causing the HMI to operate in an aspect determined on the basis of the driving support information transmitted from the on-board driving support device 21 and the coordination support information transmitted from the traffic management server 6.

The mobile information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a degree of saturation of oxygen in blood and transmitting the measurement data of the biological information to the traffic management server 6, transmitting pedestrian information regarding the pedestrian 4 such as position information, travel acceleration, and schedule information of the pedestrian 4, and receiving the coordination support information transmitted from the traffic management server 6.

Further, the mobile information processing terminal 40 includes a notifier 42 that notifies the pedestrian of various kinds of information through auditory sense, visual sense, haptic sense, and the like, of the pedestrian by causing the HMI to operate in an aspect determined on the basis of the received coordination support information.

The infrastructure camera 56 captures images of traffic infrastructure equipment including a road, an intersection and a pavement in a target traffic area and moving bodies and pedestrians that move on the road, the intersection, the pavement, and the like, and transmits the obtained image information to the traffic management server 6.

The traffic light control device 55 controls the traffic lights and transmits traffic light state information regarding current lighting color of the traffic lights provided in the target traffic area, a timing at which the lighting color is switched, and the like, to the traffic management server 6.

The traffic management server 6 is a computer that supports safe and smooth traffic of traffic participants in the target traffic area by generating coordination support information for encouraging communication between the traffic participants and recognition of a surrounding traffic environment for each traffic participant to be supported on the basis of the information acquired from a plurality of area terminals existing in the target traffic area as described above and notifying each traffic participant of the coordination support information. Note that in the present embodiment, traffic participants including means for receiving the coordination support information generated at the traffic management server 6 and causing the HMI to operate in an aspect determined on the basis of the received coordination support information (for example, the on-board devices 20 and 30, the mobile information processing terminal 40 and the notifiers 22, 32 and 42) among the plurality of traffic participants existing in the target traffic area are set as targets to be supported by the traffic management server 6.

The traffic management server 6 includes a target traffic area recognizer 60 that recognizes persons and moving bodies in the target traffic area as individual traffic participants, a driving subject information acquirer 61 that acquires driving subject state information correlated with driving capabilities of driving subjects of the moving bodies recognized as the traffic participants by the target traffic area recognizer 60, a predictor 62 that predicts futures of a plurality of traffic participants in the target traffic area, a support controller 65 that executes support control to support safe traffic for individual traffic participants who are recognized as support targets by the target traffic area recognizer 60 by using prediction results of the predictor 62, a traffic environment database 67 in which information regarding a traffic environment of the target traffic area is accumulated, and a driving history database 68 in which information regarding past driving history by the driving subjects registered in advance is accumulated.

In the traffic environment database 67, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and risk area information regarding a high risk area with a particularly high risk in the target traffic area, is stored. In the following description, the information stored in the traffic environment database 67 will be also referred to as registered traffic environment information.

In the driving history database 68, information regarding past driving history of the driving subjects registered in advance is stored in association with registration numbers of moving bodies possessed by the driving subjects. Thus, if the registration numbers of the recognized moving bodies can be specified by the target traffic area recognizer 60 which will be described later, the past driving history of the driving subjects of the recognized moving bodies can be acquired by searching the driving history database 68 on the basis of the registration numbers. In the following description, the information stored in the driving history database 68 will also be referred to as registered driving history information.

The target traffic area recognizer 60 recognizes traffic participants that are persons or moving bodies in the target traffic area and recognition targets including traffic environments of the respective traffic participants in the target traffic area on the basis of the information transmitted from the above-described area terminal (the on-board devices 20 and 30, the mobile information processing terminal 40, the infrastructure camera 56 and the traffic light control device 55) in the target traffic area and the registered traffic environment information read from the traffic environment database 67 and acquires recognition information regarding the recognition targets.

Here, the information transmitted from the on-board driving support device 21 and the on-board communication device 24 included in the on-board devices 20 to the target traffic area recognizer 60 and the information transmitted from the on-board driving support device 31 and the on-board communication device 34 included in the on-board devices 30 to the target traffic area recognizer 60 include information regarding traffic participants around the own vehicle and a state regarding the traffic environment acquired by the external sensor unit, information regarding a state of the own vehicle as one traffic participant acquired by the own vehicle state sensor, the navigation device and the like, and the like. Further, the information transmitted from the mobile information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 67 includes information regarding traffic environments of the respective traffic participants such as map information, the risk area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, a moving vector (that is, a vector extending along a moving direction and having a length proportional to moving speed), travel acceleration, a vehicle type of the moving body, a vehicle rank, registration number of the moving body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, and the risk area information on the basis of the information transmitted from the area terminals.

The target traffic area recognizer 60 transmits the traffic participant recognition information and the traffic environment recognition information acquired as described above to the driving subject information acquirer 61, the predictor 62, the support controller 65, and the like.

The driving subject information acquirer 61 acquires driving subject state information and driving subject characteristic information correlated with current driving capabilities of the driving subjects of the moving bodies recognized as the traffic participants by the target traffic area recognizer 60 on the basis of the information transmitted from the above-described area terminals (particularly, the on-board devices 20 and 30) in the target traffic area and the registered driving history information read from the driving history database 68.

More specifically, in a case where the driving subject of the four-wheeled vehicle recognized as the traffic participant by the target traffic area recognizer 60 is a person, the driving subject information acquirer 61 acquires the information transmitted from the on-board devices 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board devices 30 mounted on the motorcycle as driving subject state information of the rider.

Here, the information to be transmitted from the driving subject state sensor 23 and the on-board communication device 24 included in the on-board devices 20 to the driving subject information acquirer 61 includes face image data of the driver who is driving, and time-series data such as biological information of the driver who is driving, which is correlated with driving capability of the driver who is driving. Further, the information to be transmitted from the rider state sensor 33 and the on-board communication device 34 included in the on-board devices 30 to the driving subject information acquirer 61 includes face image data of the rider who is driving, and time-series data such as biological information of the rider who is driving, which is correlated with driving capability of the rider who is driving. Further, the information to be transmitted from the mobile information processing terminals 25 and 35 included in the on-board devices 20 and 30 to the driving subject information acquirer 61 includes personal schedule information of the driver and the rider. In a case where the driver and the rider drive the moving bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body who is driving by using both or one of the driving subject state information for the driving subject acquired through the following procedure and the registered driving history information read from the driving history database 68.

The driving subject information acquirer 61 transmits the driving subject state information and the driving subject characteristic information of the driving subject acquired as described above to the predictor 62, the support controller 65 and the like.

The predictor 62 extracts part of the traffic area in the target traffic area as a monitoring area and predicts risks in the future of prediction target determined among a plurality of traffic participants in the monitoring area on the basis of the traffic participant recognition information and the traffic environment recognition information acquired by the target traffic area recognizer 60 and the driving subject state information and the driving subject characteristic information acquired by the driving subject information acquirer 61.

Here, the target traffic area is a traffic area of a relatively broad range determined, for example, in municipal units. In contrast, the monitoring area is a traffic area such as, for example, an area near an intersection and a specific facility, through which a four-wheeled vehicle can pass in an approximately few tens of seconds in a case where the four-wheeled vehicle travels at legal speed.

Figure 3:
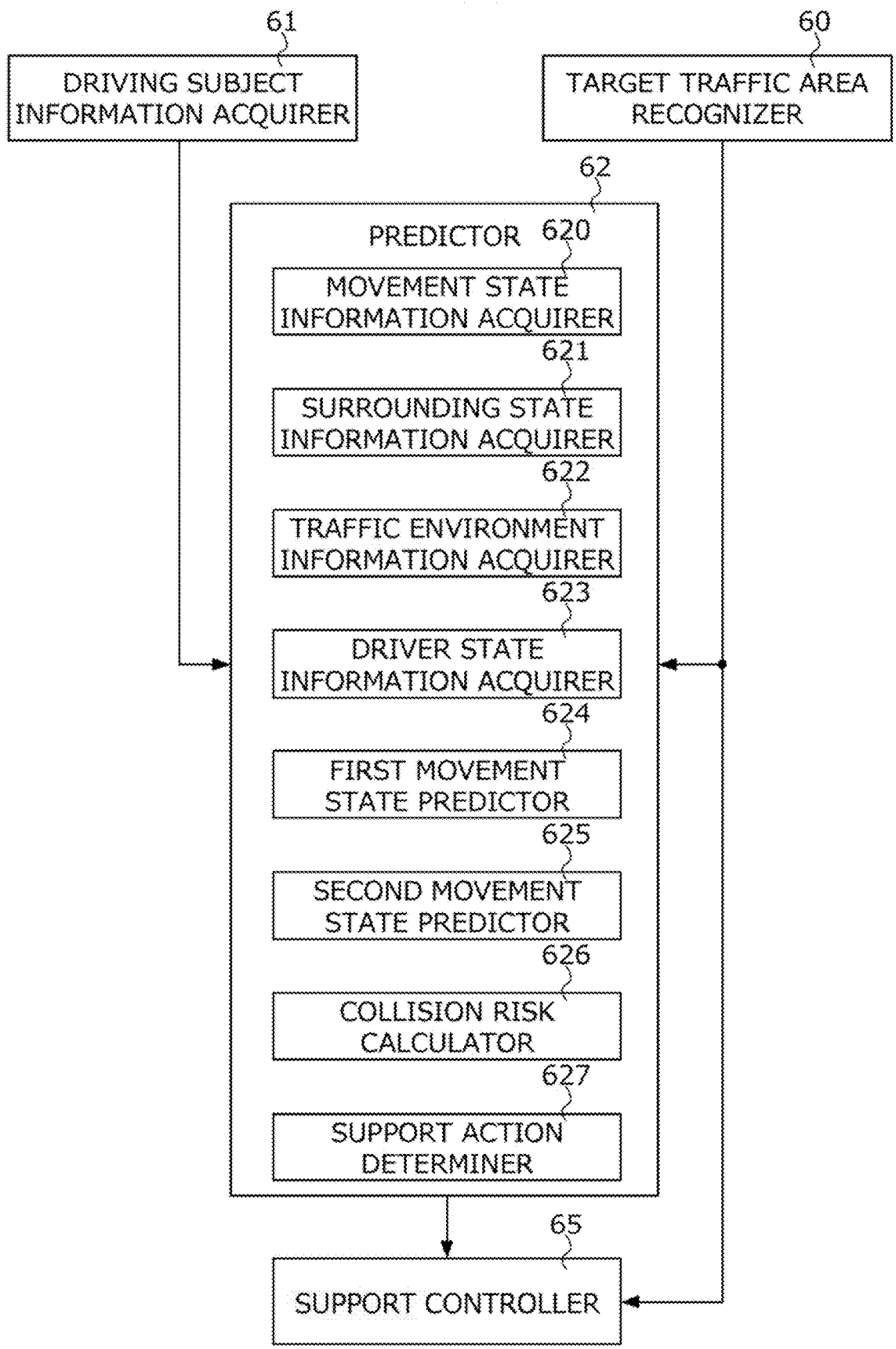
FIG. 3 is a functional block diagram illustrating a specific configuration of a predictor.

FIG. 3 is a functional block diagram illustrating a specific configuration of the predictor 62. The predictor 62, which includes a movement state information acquirer 620, a surrounding state information acquirer 621, a traffic environment information acquirer 622, a driver state information acquirer 623, a first movement state predictor 624, a second movement state predictor 625, a collision risk calculator 626, and a support action determiner 627, predicts future risks of the prediction target in the monitoring area by using these.

The movement state information acquirer 620 determines, as a prediction target, one person among the plurality of traffic participants existing in the monitoring area on the basis of the traffic participant recognition information transmitted from the target traffic area recognizer 60, and acquires movement state information regarding a movement state of the prediction target. More specifically, the movement state information acquirer 620 extracts information regarding a movement state of the prediction target from the traffic participant recognition information acquired by the target traffic area recognizer 60, and acquires the extracted information as the movement state information. Here, the movement state information includes, for example, a plurality of parameters that characterize a movement state of the prediction target such as a position of the prediction target, a moving vector, travel acceleration, a vehicle type, and a vehicle rank.

The surrounding state information acquirer 621 specifies a plurality of traffic participants existing around the prediction target in the monitoring area (hereinafter, the traffic participants existing around the prediction target are also referred to as "surrounding traffic participants") on the basis of the traffic participant recognition information transmitted from the target traffic area recognizer 60, and acquires surrounding state information regarding movement states of the plurality of traffic participants existing around the prediction target. More specifically, the surrounding state information acquirer 621 extracts information regarding movement states of the plurality of traffic participants existing around the prediction target from the traffic participant recognition information acquired by the target traffic area recognizer 60, and acquires the extracted information as the surrounding state information. Here, the surrounding state information includes, for example, a plurality of parameters that characterize a movement state of each traffic participant such as a position, a moving vector, travel acceleration, a vehicle type, and a vehicle rank of each traffic participant existing around the prediction target.

The traffic environment information acquirer 622 acquires traffic environment information of the surroundings of the prediction target in the monitoring area on the basis of the traffic environment recognition information transmitted from the target traffic area recognizer 60 and the registered traffic environment information stored in the traffic environment database 67. More specifically, the traffic environment information acquirer 622 extracts information regarding a surrounding traffic environment for the monitoring area or the prediction target from the traffic environment recognition information acquired by the target traffic area recognizer 60 and the registered traffic environment information stored in the traffic environment database 67, and acquires the extracted information as the traffic environment information. Here, the traffic environment information includes, for example, a plurality of parameters that characterize a surrounding traffic environment for the prediction target such as a width of the road, the number of lanes, speed limit, a width of the pavement, whether or not there is a guardrail between the road and the pavement, lighting color of the traffic light, a switching timing of the lighting color, and the risk area information.

The driver state information acquirer 623 acquires driver state information regarding a state of a driver of the prediction target on the basis of the driving subject state information transmitted from the driving subject information acquirer 61. More specifically, the driver state information acquirer 623 acquires information regarding a state of confirmation of surroundings by the driver of the prediction target as driver state information on the basis of the driving subject state information transmitted from the driving subject information acquirer 61, the movement state information acquired by the movement state information acquirer 620, the surrounding state information acquired by the surrounding state information acquirer 621, and the traffic environment information acquired by the traffic environment information acquirer 622.

More specifically, the driver state information acquirer 623 extracts confirmation targets whose existence and states are to be confirmed by the driver of the prediction target (for example, the existence of moving bodies and pedestrians around the prediction target, such as a preceding vehicle, a following vehicle, and a parallel traveling vehicle, a state of the traffic light, and the like) on the basis of the movement state information, the surrounding state information, and the traffic environment information, so that the prediction target can safely and smoothly move in the monitoring area.

Further, the driver state information acquirer 623 extracts information regarding a driver of the prediction target from the driving subject state information transmitted from the driving subject information acquirer 61, and generates, as the driver state information, information regarding the confirmation state for each of the confirmation targets extracted as described above on the basis of the driving subject state information for the driver of the prediction target. The driving subject information acquired by the driving subject information acquirer 61 as described above includes face image data of the driver of the prediction target, time-series data such as biological information of the driver of the prediction target, and schedule information of the driver. Thus, the driver state information acquirer 623 generates confirmation state information on the basis of such driving subject information.

Note that in the present embodiment, a case will be described where the number of confirmations of the confirmation targets by the driver and a time period for confirmations by the driver are assumed to be the driver state information. In this case, the driver state information acquirer 623 calculates a direction of a line of sight of the driver on the basis of the face image data of the driver of the prediction target. Further, the driver state information acquirer 623 calculates a relative position of each confirmation target with respect to the driver of the prediction target on the basis of the movement state information, the surrounding state information, and the traffic environment information, and calculates a line-of-sight range in the direction of the line of sight of the driver for each of the confirmation targets according to the calculated relative position. Still further, the driver state information acquirer 623 counts the number of confirmations and the time period for confirmations with respect to the confirmation targets on condition that the direction of the line of sight of the driver is within the line-of-sight range determined for each of the confirmation targets.

The first movement state predictor 624 predicts a movement state of the prediction target in the monitoring area up to a predetermined predicted period ahead on the basis of the movement state information, the surrounding state information, and the traffic environment information. Hereinafter, the movement state of the prediction target up to the predicted period ahead, predicted by the first movement state predictor 624, is also referred to as a "first predicted movement state". In other words, the first movement state predictor 624 calculates a moving speed profile of the prediction target from a current time point to the predicted period ahead as a parameter characterizing the first predicted movement state of the prediction target. Hereinafter, the moving speed profile calculated by the first movement state predictor 624 is also referred to as a "first predicted moving speed profile".

More specifically, the first movement state predictor 624 calculates a predicted traveling path to the predicted period ahead of the prediction target in the monitoring area on the basis of the movement state information, surrounding state information, the traffic environment information, and the like. The first movement state predictor 624 obtains current moving speed and travel acceleration of the prediction target on the basis of the movement state information and calculates the first predicted moving speed profile under an assumption that the prediction target will move along this predicted traveling path. More specifically, the first movement state predictor 624 calculates the first predicted moving speed profile by assuming that the prediction target will move from the current moving speed to a constant speed after acceleration/deceleration for a predetermined time ahead under the current traveling acceleration.

The second movement state predictor 625 predicts a movement state of the prediction target in the monitoring area up to the predicted period ahead on the basis of the movement state information, the surrounding state information, the traffic environment information, and the driver state information. Hereinafter, the movement state of the prediction target up to the predicted period ahead, predicted by the second movement state predictor 625, is also referred to as a "second predicted movement state". In other words, the second movement state predictor 625 calculates a moving speed profile of the prediction target from the current time point to the predicted period ahead as a parameter characterizing the second predicted movement state of the prediction target. Hereinafter, the moving speed profile calculated by the second movement state predictor 625 is also referred to as a "second predicted moving speed profile".

More specifically, the second movement state predictor 625 calculates a predicted traveling path to the predicted period ahead of the prediction target in the monitoring area on the basis of the movement state information, surrounding state information, the traffic environment information, and the like. The second movement state predictor 625 calculates the second predicted moving speed profile on an assumption that the prediction target will move along this predicted traveling path, on the basis of the driver state information including information regarding the surrounding confirmation state of the driver of the prediction target. In the following, a specific procedure for calculating the second predicted moving speed profile for the prediction target in the second movement state predictor 625 will be described with reference to FIG. 4 through 8B.

Figure 4:
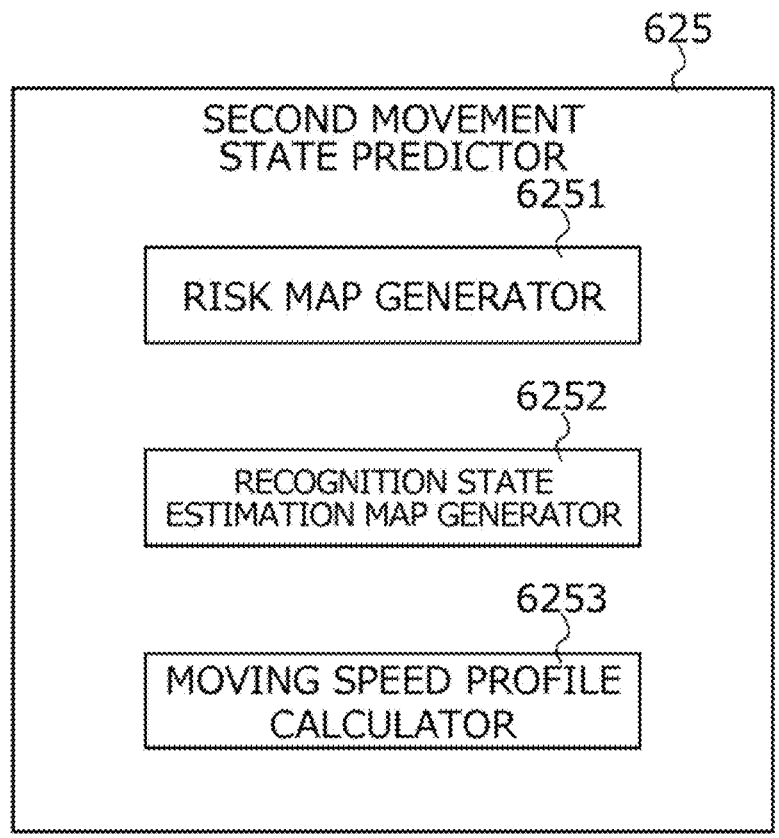
FIG. 4 is a functional block diagram illustrating a specific configuration of a second movement state predictor.

FIG. 4 is a functional block diagram illustrating a specific configuration of the second movement state predictor 625. The second movement state predictor 625, which includes a risk map generator 6251, a recognition state estimation map generator 6252, and a moving speed profile calculator 6253, calculates a second predicted moving speed profile of the prediction target by using these.

The risk map generator 6251 first calculates a predicted traveling path of the prediction target in the monitoring area up to the predicted period ahead on the basis of the movement state information, the surrounding state information, the traffic environment information, and the like. Note that in this event, the risk map generator 6251 may calculate the predicted traveling path while reflecting the registered driving history information for the driver of the prediction target transmitted from the driving subject information acquirer 61.

Next, the risk map generator 6251 generates a risk map that associates the moving speed of the prediction target with a collision risk value in the future of the prediction target on the basis of the movement state information, the surrounding state information and the traffic environment information. Here, a specific example of the risk map and specific procedure for generating the risk map in the risk map generator 6251 will be described with reference to FIGS. 5 to 7.

Figure 5:
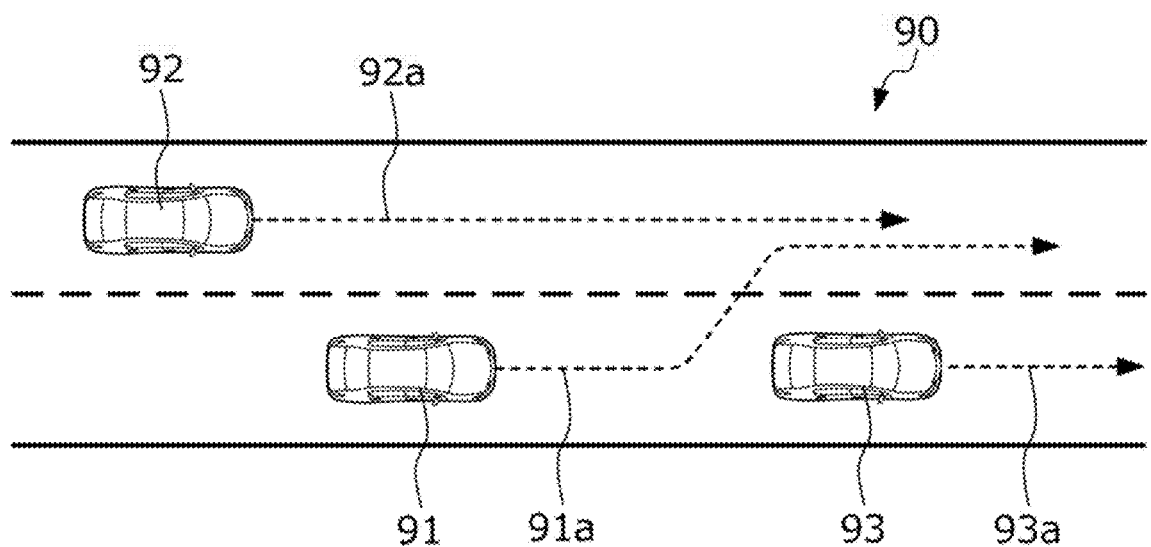
FIG. 5 is a view illustrating an example of a monitoring area.

FIG. 5 is a view illustrating an example of a monitoring area 90. FIG. 5 illustrates a case where traffic participants 91, 92, and 93 which are three four-wheeled vehicles are traveling in the monitoring area 90 which is a straight road with two lanes on each side. As illustrated in FIG. 5, at a time point at which prediction processing in the second movement state predictor 625 is started, the third traffic participant 93 and the first traffic participant 91 are traveling on the lane on the right side in order from the top, and the second traffic participant 92 is traveling on the lane on the left side and slightly behind the first traffic participant 91. Further, at the time point at which the prediction processing in the second movement state predictor 625 is started, the third traffic participant 93 is traveling at a speed slower than the speed of the first traffic participant 91, and the second traffic participant 92 is traveling at a speed faster than the speed of the first traffic participant 91.

First, the risk map generator 6251 calculates predicted traveling paths 91a, 92a, and 93a of the respective traffic participants 91, 92, and 93 as indicated by dashed-line arrows in FIG. 5. In other words, the risk map generator 6251 calculates the predicted traveling path 93a for the third traffic participant 93 that is traveling straight on the lane on the right side, and calculates the predicted traveling path 92a for the second traffic participant 92 that is traveling straight on the lane on the left side. Further, the risk map generator 6251 calculates the predicted traveling path 91a for the first traffic participant 91 that travels straight on the lane on the right side, and then overtakes the third traffic participant 93 by changing the lane to the lane on the left side at a time point at which the first traffic participant 91 arrives behind the third traffic participant 93 by a predetermined distance.

Next, the risk map generator 6251 generates a risk map for the prediction target in a case where the traffic participants 91 to 93 are assumed to travel along the respective predicted traveling paths 91a to 93a up to the predicted period ahead, on the basis of the movement state information, the surrounding state information and the traffic environment information.

Figure 6:
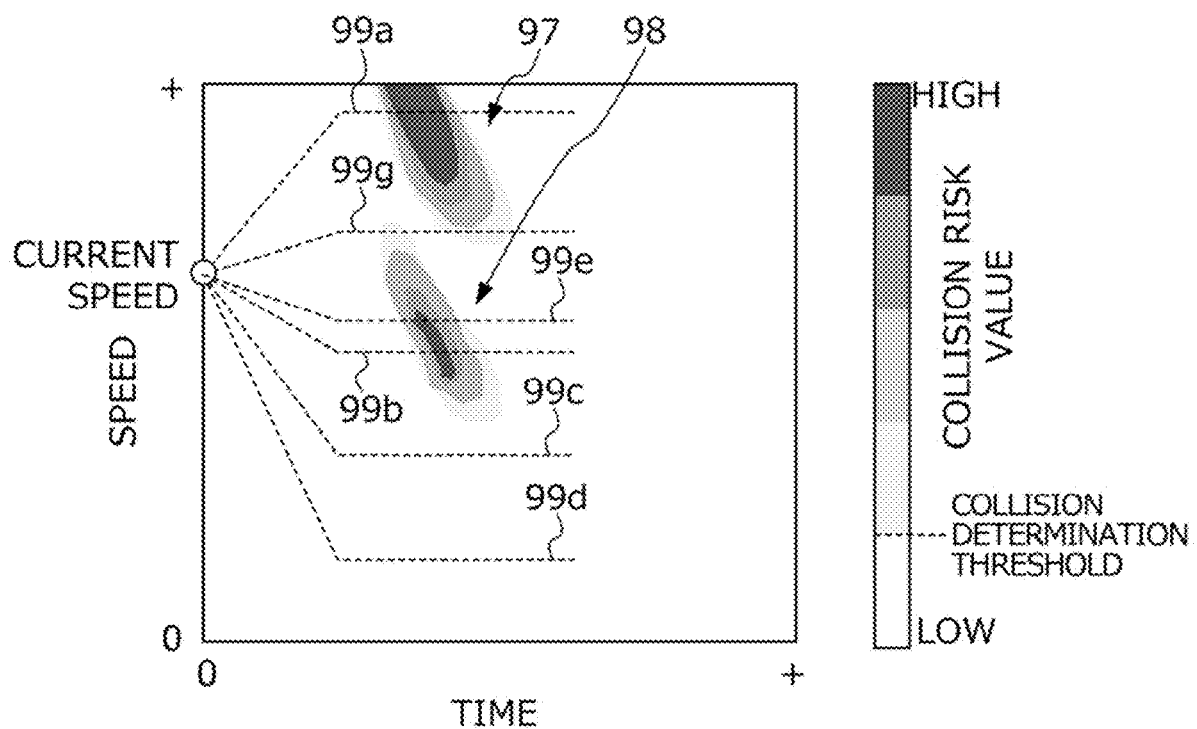
FIG. 6 is a view illustrating an example of a risk map for a first traffic participant defined as a prediction target under the example illustrated in FIG. 5, the map being generated by a risk map generator.

FIG. 6 is a view illustrating an example of a risk map for the first traffic participant 91 as the prediction target, the map being generated by the risk map generator 6251 under the example illustrated in FIG. 5. As illustrated in FIG. 6, the risk map is a three-dimensional map obtained by plotting collision risk values for the prediction target on a two-dimensional plane in which the horizontal axis represents time and the vertical axis represents a speed. Note that in FIG. 6, a current speed of the prediction target, or, a moving speed of the first traffic participant 91 at a start time point of the prediction processing is indicated by a white circle.

As illustrated in FIG. 6, two high risk regions 97 and 98 having a particularly large collision risk value exist in the risk map generated for the first traffic participant 91 as the prediction target under the example illustrated in FIG. 5. The high risk region 97 appearing in a high speed region in FIG. 6 indicates that the first traffic participant 91 is likely to collide with the third traffic participant 93 from behind, and the high risk region 98 appearing in a low speed region indicates that the first traffic participant 91 that has changed the lane is likely to contact the second traffic participant 92.

Thus, according to the risk map illustrated in FIG. 6, in a case where the prediction target accelerates according to a moving speed profile as indicated by a broken line 99a, for example, it can be predicted that the prediction target is highly likely to collide with the third traffic participant 93 from behind. Further, according to the risk map illustrated in FIG. 6, in a case where the prediction target decelerates according to a moving speed profile as indicated by a broken line 99b, for example, it can be predicted that the prediction target is highly likely to contact the second traffic participant 92. Still further, according to the risk map illustrated in FIG. 6, in a case where the prediction target decelerates at a deceleration greater than the deceleration indicated by the broken line 99b, as indicated by a broken line 99c, for example, it can be predicted that the prediction target is highly likely to be capable of avoiding collision with the third traffic participant 93 and the second traffic participant 92. This indicates that, in the example illustrated in FIG. 5, the first traffic participant 91 as the prediction target decelerates until the second traffic participant 92 overtakes the first traffic participant 91, and then changes the lane to overtake the third traffic participant 93, which makes it possible to avoid collision with the other traffic participants 92 and 93.

Figure 7:
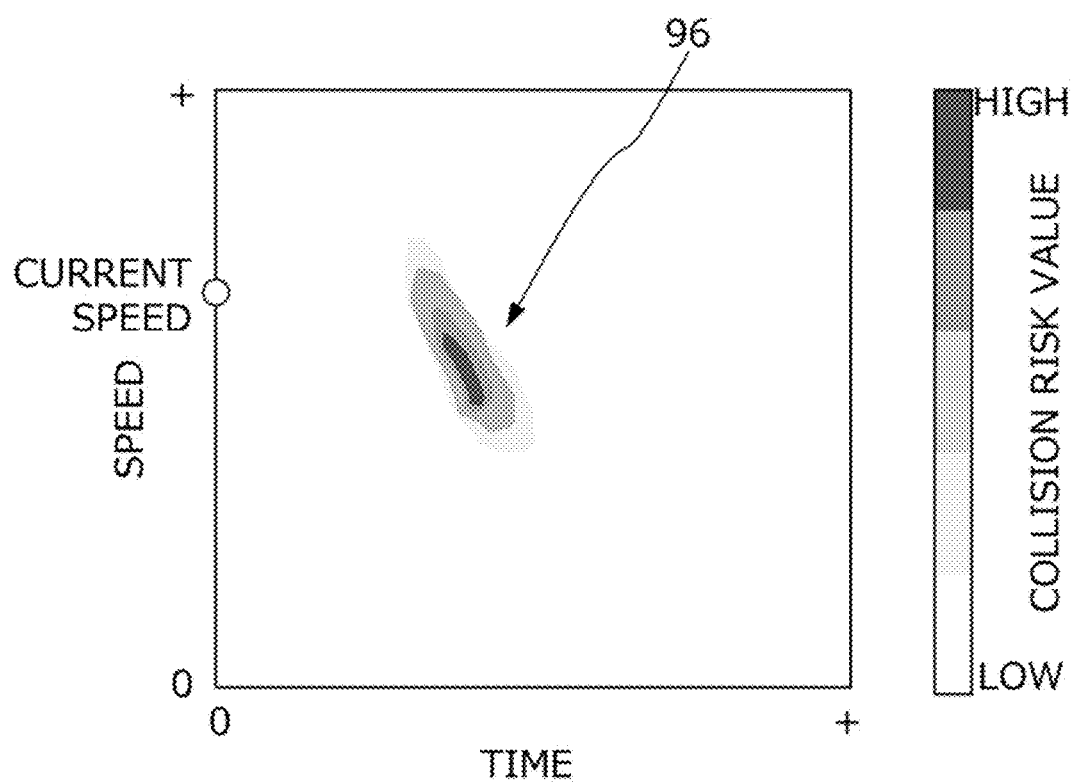
FIG. 7 is a view illustrating an example of the risk map for a second traffic participant defined as a prediction target under the example illustrated in FIG. 5, the map being generated by the risk map generator.

FIG. 7 is a view illustrating an example of a risk map for the second traffic participant 92 as the prediction target, the map being generated by the risk map generator 6251 under the example illustrated in FIG. 5. Note that in FIG. 7, a current speed of the prediction target, or, a moving speed of the second traffic participant 92 at a start time point of the prediction processing is indicated by a white circle.

As illustrated in FIG. 7, one high risk region 96 having a particularly large collision risk value exists in the risk map generated for the second traffic participant 92 as the prediction target under the example illustrated in FIG. 5. The high risk region 96 illustrated in FIG. 7 indicates that the second traffic participant 92 is likely to contact the first traffic participant 91 that has changed the lane. Note that the second traffic participant 92 is assumed to travel on the lane different from the lane of the third traffic participant 93, so that there is no possibility that the second traffic participant 92 will collide with the third traffic participant 93. Thus, the risk map for the second traffic participant 92 is different from the risk map for the first traffic participant 91 illustrated in FIG. 6, and includes no high risk region corresponding to the third traffic participant 93.

Returning to FIG. 4, the risk map generator 6251 generates risk maps as described above on the basis of the movement state information, the surrounding state information and the traffic environment information. Note that in this event, the risk map generator 6251 generates the risk map for the prediction target without using the driver state information for the driver of the prediction target. This means that the risk map generated by the risk map generator 6251 corresponds to a risk map generated for the prediction target by using only objective information (the movement state information, the surrounding state information, and the traffic environment information) from which subjectivity (the driver state information regarding the surrounding confirmation state of the driver) by the driver of the prediction target is eliminated.

The recognition state estimation map generator 6252 generates a recognition state estimation map corresponding to a risk map viewed from the driver of the prediction target by correcting the risk map generated by the risk map generator 6251 on the basis of the driver state information of the driver of the prediction target.

As described with reference to FIGS. 6 and 7, the risk map generated by the risk map generator 6251 is generated by eliminating subjectivity by the driver of the prediction target. In other words, in the example illustrated in FIG. 6, the risk map for the first traffic participant 91 includes the two high risk regions 97 and 98, but the driver of the first traffic participant 91 cannot appropriately recognize the existence of the high risk regions 97 and 98 if the driver of the first traffic participant 91 cannot appropriately grasp the existence, positions, speeds of the traffic participants 92 and 93 around the first traffic participant 91. Thus, the recognition state estimation map generator 6252 generates a recognition state estimation map by correcting the risk map for the prediction target generated by the risk map generator 6251 on the basis of the driver state information of the driver of the prediction target.

More specifically, the recognition state estimation map generator 6252 first estimate the level of recognition for each of the confirmation targets existing around the prediction target on the basis of the driver state information of the driver of the prediction target generated by the driver state information acquirer 623. Note that in the following description, a case will be described where the level of recognition for each of the confirmation targets is classified into three stages (high, medium, and low) but the present invention is not limited to this.

In a case where the number of confirmations with respect to a confirmation target is equal to or more than a predetermined first number of confirmations or in a case where the time period for confirmations with respect to the confirmation target is equal to or longer than a predetermined first time period for confirmations, the recognition state estimation map generator 6252 estimates that the driver appropriately recognizes the existence, position, speed and the like of the confirmation target, and estimates the level of recognition of the confirmation target by the driver as "high".

In a case where the number of confirmations with respect to a confirmation target is less than the above-described first number of confirmations and is equal to or more than a second number of confirmations set smaller than the first number of confirmations or in a case where the time period for confirmations with respect to the confirmation target is shorter than the above-described first time period for confirmations and is equal to or longer than a second time period for confirmations set shorter than the first time period for confirmations, the recognition state estimation map generator 6252 estimates that the driver estimates the existence of the confirmation target but may be unable to appropriately recognize the position, speed and the like of the confirmation target, and estimates the level of recognition of the confirmation target by the driver as "medium".

Further, in a case where the number of confirmations with respect to a confirmation target is less than the above-described second number of confirmations or in a case where the time period for confirmations with respect to the confirmation target is shorter than the above-described second time period for confirmations, the recognition state estimation map generator 6252 estimates that the driver may be unable to recognizes the existence of the confirmation target, and estimates the level of recognition of the confirmation target by the driver as "low".

Next, the recognition state estimation map generator 6252 generates a recognition state estimation map by correcting the risk map on the basis of the level of recognition by the driver estimated for each of the confirmation targets. More specifically, the recognition state estimation map generator 6252 generates a recognition state estimation map by eliminating the existence of a high risk region corresponding to the confirmation target having the level of recognition estimated as "low" among the plurality of high risk regions included in the risk map.

Figure 8A:
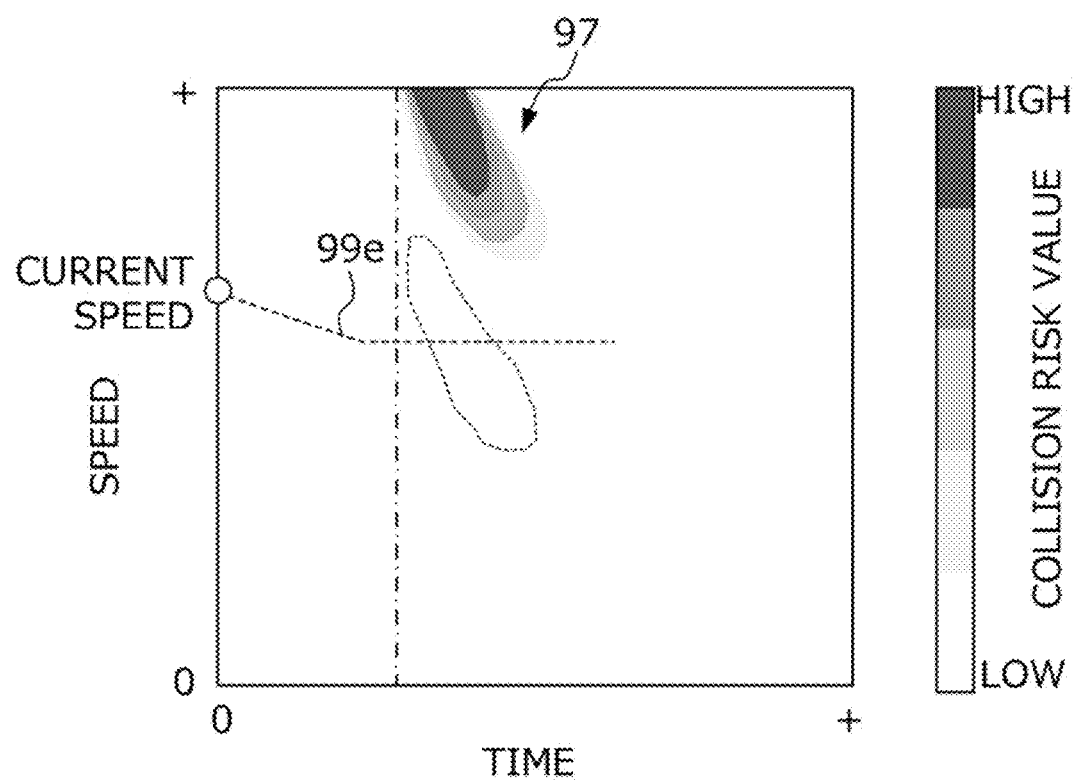
FIG. 8A is a view illustrating an example of a recognition state estimation map in a case where the first traffic participant is defined as a prediction target in the example illustrated in FIG. 5.

FIG. 8A is a view illustrating an example of a recognition state estimation map for the driver of a prediction target in a case where the first traffic participant 91 is defined as the prediction target, the level of recognition of the third traffic participant 93 by the driver of the prediction target is estimated as "high", and the level of recognition of the second traffic participant 92 is estimated as "low" in the example illustrated in FIG. 5. As is apparent from a comparison between the recognition state estimation map illustrated in FIG. 8A and the reference risk map illustrated in FIG. 6, the driver of the prediction target cannot recognize the existence of the second traffic participant 92, and therefore the recognition state estimation map for the driver of the prediction target (see FIG. 8A) does not include the high risk region 98 illustrated in FIG. 6.

Further, the recognition state estimation map generator 6252 generates a recognition state estimation map by changing a position of a high risk region corresponding to the confirmation target having the level of recognition estimated as "medium" among the plurality of high risk regions included in the risk map to a distant position from the prediction target.

Figure 8B:
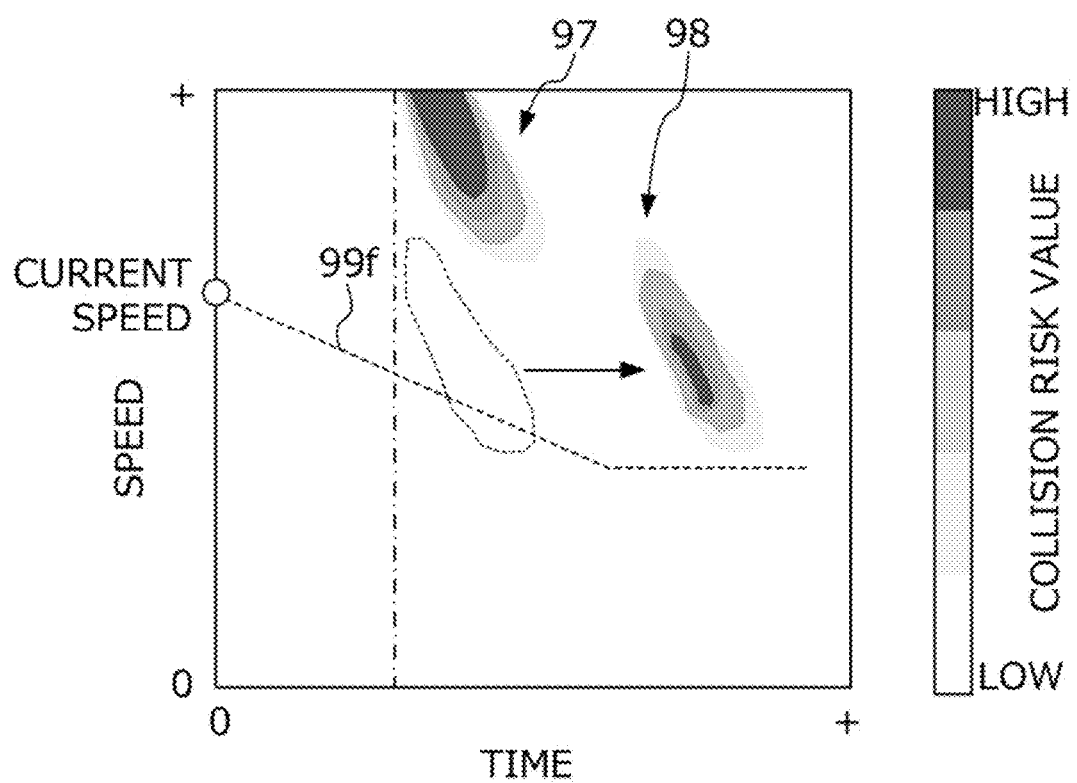
FIG. 8B is a view illustrating an example of a recognition state estimation map in a case where the first traffic participant is defined as a prediction target in the example illustrated in FIG. 5.

FIG. 8B is a view illustrating an example of a recognition state estimation map for the driver of a prediction target in a case where the first traffic participant 91 is defined as the prediction target, the level of recognition of the third traffic participant 93 by the driver of the prediction target is estimated as "high", and the level of recognition of the second traffic participant 92 is estimated as "medium" in the example illustrated in FIG. 5. As is apparent from a comparison between the recognition state estimation map illustrated in FIG. 8B and the risk map illustrated in FIG. 6, the position of the high risk region 98 in the recognition state estimation map in FIG. 8B is corrected to a later position along the time axis than the position of the high risk region 98 in the risk map in FIG. 6. In other words, it is considered that the driver of the prediction target recognizes the existence of the second traffic participant 92 but incorrectly recognizes that the second traffic participant 92 exists farther than the actual position. Thus, the recognition state estimation map generator 6252 corrects the position of the high risk region 98 to a later position along the time axis than that in the risk map in FIG. 6.

Further, the recognition state estimation map generator 6252 generates a recognition state estimation map without correcting a high risk region corresponding to the confirmation target having the level of recognition estimated as "high" among the plurality of high risk regions included in the risk map. In other words, a recognition state estimation map for the driver of a prediction target in a case where the first traffic participant 91 is defined as the prediction target and the levels of recognition of the second traffic participant 92 and the third traffic participant 93 by the driver of the prediction target are estimated as "high" in the example illustrate in FIG. 5 is equal to the risk map illustrated in FIG. 6.

Returning to FIG. 4, the moving speed profile calculator 6253 calculates a second predicted moving speed profile for the prediction target up to a prediction period ahead on the basis of the recognition state estimation map for the driver of the prediction target generated by the recognition state estimation map generator 6252 according to the above-described procedure. More specifically, the moving speed profile calculator 6253 calculates a second predicted moving speed profile by assuming that in order to avoid risks estimated on the basis of the recognition state estimation map, the driver of the prediction target moves the prediction target at constant acceleration or deceleration from the current speed and then the speed of the prediction target transitions to a constant speed.

More specifically, the moving speed profile calculator 6253 calculates the second predicted moving speed profile as a moving speed profile from a current time point to the predetermined period ahead so that an evaluation value shown in the following equation (1) becomes maximum. In the following equation (1), a "maximum risk value" is a maximum value of the collision risk value calculated by searching the recognition state estimation map on the basis of the moving speed profile. In the following equation (1), a "moving period" is a period required to transition from the current time point to the constant speed in the moving speed profile. Further, in the following equation (1), "acceleration or deceleration" is an absolute value of the acceleration of the prediction target until the speed of the prediction target transitions from the current time point to the constant speed in the moving speed profile. Further, in the following equation (1), "a" and "b" each are positive coefficients.

$$\text{Evaluation value} = 1/(\text{Maximum risk value} + a \times \text{Moving period} + b \times \text{Acceleration or deceleration}) \quad (1)$$

Since the driver of the prediction target attempts to avoid the risks recognized by himself/herself as much as possible, the evaluation value increases as the collision risk value calculated on the basis of the recognition state estimation map is reduced as shown in the above equation. Since the driver of the prediction target is likely to attempt to avoid the risks under the least possible acceleration or deceleration, the evaluation value increases as the acceleration or deceleration is reduced as shown in the above equation. Further, since the driver of the prediction target is likely to attempt to avoid the risks as quickly as possible, the evaluation value increases as the moving period required for a transition to the constant speed is reduced as shown in the above equation. Thus, the moving speed profile calculator 6253 calculates the second predicted moving speed profile so that both of the collision risk value and the acceleration or deceleration of the prediction target to be calculated on the basis of the recognition state estimation map are reduced and the moving period required for a transition to the constant speed is reduced.

Here, a specific example of the evaluation value will be described using the recognition state estimation nap illustrated in FIG. 6 for an example. In FIG. 6, both of the maximum risk values calculated under the moving speed profiles indicated by the broken lines 99a and 99c are greater than the maximum risk values calculated under the moving speed profiles indicated by the broken lines 99c and 99d. Further, the acceleration or deceleration in the moving speed profile indicated by the broken line 99a is greater than the acceleration or deceleration in the moving speed profile indicated by the broken line 99b. Further, the acceleration or deceleration in the moving speed profile indicated by the broken line 99d is greater than the acceleration or deceleration in the moving speed profile indicated by the broken line 99c. Thus, in the example illustrated in FIG. 6, the evaluation value is greater in order of the broken lines 99a, 99b, 99d, and 99c. Thus, in a case where the recognition state estimation map is equal to the risk map illustrated in FIG. 6, that is, in a case where the driver of the first traffic participant 91 as the prediction target appropriately recognizes the second traffic participant 92 and the third traffic participant 93 existing around the first traffic participant 91, the moving speed profile calculator 6253 calculates the second predicted moving speed profile as the moving speed profile indicated by the broken line 99c in which the evaluation value becomes maximum.

Further, in a case where the recognition state estimation map is equal to the recognition state estimation map illustrated in FIG. 8A, that is, in a case where the driver of the first traffic participant 91 as the prediction target cannot recognize the existence of the second traffic participant 92, the moving speed profile calculator 6253 calculates the moving speed profile indicated by the broken line 99e as the second predicted moving speed profile in which the evaluation value becomes maximum.

Further, in a case where the recognition state estimation map is equal to the recognition state estimation map illustrated in FIG. 8B, that is, in a case where the driver of the first traffic participant 91 as the prediction target cannot appropriately recognize the position and speed of the second traffic participant 92, the moving speed profile calculator 6253 calculates the moving speed profile indicated by the broken line 99f as the second predicted moving speed profile in which the evaluation value becomes maximum.

The second movement state predictor 625 predicts the second predicted movement state of the prediction target on the basis of a different algorithm than the first movement state predictor 624 according to the procedure described above.

Returning to FIG. 3, the collision risk calculator 626 calculates, on the basis of the movement state information, the surrounding state information, and traffic environment information, a first collision risk value indicating a collision risk between the prediction target and the surrounding traffic participants in the first predicted movement state and a second collision risk value indicating a collision risk between the prediction target and the surrounding traffic participants in the second predicted movement state.

More specifically, the collision risk calculator 626 obtains the risk map for the prediction target generated by the risk map generator 6251 described above, calculates the first collision risk value by searching the risk map on the basis of the first predicted moving speed profile calculated by the first moving state predictor 624, and calculates the second collision risk value by searching the risk map on the basis of the second predicted moving speed profile calculated by the second moving state predictor 625.

In the case where at least one of the first collision risk value and the second collision risk value calculated by the collision risk calculator 626 is greater than a predetermined collision determination threshold, the support action determiner 627 determines that the prediction target is likely to collide with the surrounding traffic participants from the current time to the predicted time ahead, and determines a support action to avoid the collision between the prediction target and the surrounding traffic participants or to mitigate damages caused by the collision. In the case where both the first and second collision risk values are below the collision determination threshold, the support action determiner 627 determines that the prediction target is unlikely to collide with the surrounding traffic participants and does not decide on a support action.

More specifically, the support action determiner 627 determines a first avoidance action, i.e., an acceleration/deceleration action along the first predicted moving speed profile, that achieves the first predicted movement state of the prediction target as the support action when the first collision risk value is less than the collision determination threshold and the second collision risk value is greater than the collision determination threshold.

The support action determiner 627 determines a second avoidance action, i.e., an acceleration/deceleration action along the second predicted moving speed profile, that achieves the second predicted movement state of the prediction target as the support action when the second collision risk value is less than the collision determination threshold and the first collision risk value is greater than the collision determination threshold.

In addition, the support action determiner 627 calculates a collision avoidance action for the prediction target to avoid a collision with surrounding traffic participants when both the first and second collision risk values are greater than the collision determination threshold, and determines this collision avoidance action as the support action. In this case, if the support action determiner 627 cannot calculate a feasible collision avoidance action, it calculates a collision damage mitigation action to reduce damage caused by a collision of the prediction target with surrounding traffic participants as much as possible, and determines this collision damage mitigation action as the support action. The support action determiner 627, for example, calculates a moving speed profile that characterizes the collision avoidance action or collision damage mitigation action on the basis of the risk map generated by the risk map generator 6251.

Here, a procedure for determining the support action by the support action determiner 627 will be described using the risk map illustrated in FIG. 6 for an example. In the following, the broken line 99g in FIG. 6 is the first predicted moving speed profile, and the broken line 99e in FIG. 6 is the second predicted moving speed profile. As shown in FIG. 6, the second predicted moving speed profile indicated by the broken line 99e crosses the center of the high risk region 98, while the first predicted moving speed profile indicated by the broken line 99g crosses the skirts of the high risk regions 97, 98. Therefore, the second collision risk value obtained by searching the risk map in FIG. 6 on the basis of the second predicted moving speed profile is greater than the first collision risk value obtained by searching the risk map in FIG. 6 on the basis of the first predicted moving speed profile. Also, both the first and second collision risk values are larger than the collision determination threshold. In this case, the support action determiner 627 calculates an acceleration/deceleration action along the moving speed profile indicated by the broken line 99c in FIG. 6 as the collision avoidance action, and determines this collision avoidance action as the support action.

Returning to FIG. 2, in the case where the predictor 62 determines that the prediction target is likely to collide with surrounding traffic participants, i.e., at least one of the first and second collision risk values is greater than the collision determination threshold, the support controller 65 executes support control to cause the prediction target to perform the support action determined by the support action determiner 627.

The on-board devices 20, 30, which are communicatively connected to the traffic management server 6 as described above, are equipped with on-board notification device 22, 32 causing the HMI to operate in an aspect determined on the basis of the coordination support information transmitted from the support controller 65, and on-board driver support device 21, 31 that automatically control the behavior of the vehicle body in a manner determined based on the coordination support information. In other words, the support controller 65 can operate the on-board notification device 22, 32 and the on-board driver support device 21, 31 by transmitting the coordination support information determined based on the support action to the on-board devices 20, 30 of the prediction target, thereby encouraging the prediction target to take support action. Therefore, in the case where at least one of the first and second collision risk values is greater than the collision determination threshold, the support controller 65 executes both or any of the following as the support control: notification control that encourages support action by operating the on-board notification device 22, 32 for the prediction target and automatic behavior control that encourages support action by operating the on-board driver support device 21, 31 for the prediction target.

In the case of the notification control, the support controller 65 transmits to the on-board devices 20, 30 of the prediction target coordination support information including information regarding the support action determined by the support action determiner 627 and information regarding the risk map for the prediction target, and operates the on-board notification device 22, 32 on the basis of the coordination support information. Accordingly, the support controller 65 notifies the driver of the prediction target of information to encourage the driver to avoid a collision or reduce damage caused by a collision (e.g., audio or image that encourage acceleration or deceleration in accordance with the support action), and the driver of the prediction target is encouraged to operate the vehicle in accordance with the support action.

FIG. 9 is an example of an image displayed by the on-board notification device 22, 32 in accordance with the notification control by the support controller 65. More specifically, FIG. 9 is an example of an image displayed when an acceleration/deceleration action along the moving speed profile indicated by the broken line 99c in the risk map shown in FIG. 6 is determined as the support action.

As shown in FIG. 9, the support controller 65 may display on the on-board notification device 22, 32 an image generated by plotting a circle 100 indicating the current speed and a moving speed profile 101 according to the support action on the risk map. In this case, the support controller 65 may highlight in red, for example, area where the collision risk value on the risk map is higher than the collision determination threshold (i.e., the high-risk areas 97, 98 in FIG. 6) so that the driver viewing the image can quickly recognize the high-risk areas, as shown by areas 102, 103 in FIG. 9. Although the figures are not shown, the on-board notification device 22, 32 may also display an icon warning of a high-risk area on a map image displayed by navigation device. By viewing such an image, the driver of the prediction target can recognize existence of a collision risk with surrounding traffic participants and procedures for driving operations to avoid or reduce this collision risk.

In the case of the automatic behavior control, the support controller 65 transmits the coordination support information including information regarding the support action determined by the support action determiner 627 to the on-board devices 20, 30 of the prediction target, and operates the on-board driving support device 21, 31 on the basis of the coordination support information. More specifically, the support controller 65 operates the on-board driving support device 21, 31 to perform support action prescribed to avoid collision or reduce damage caused by collision of the prediction target.

Figure 10:
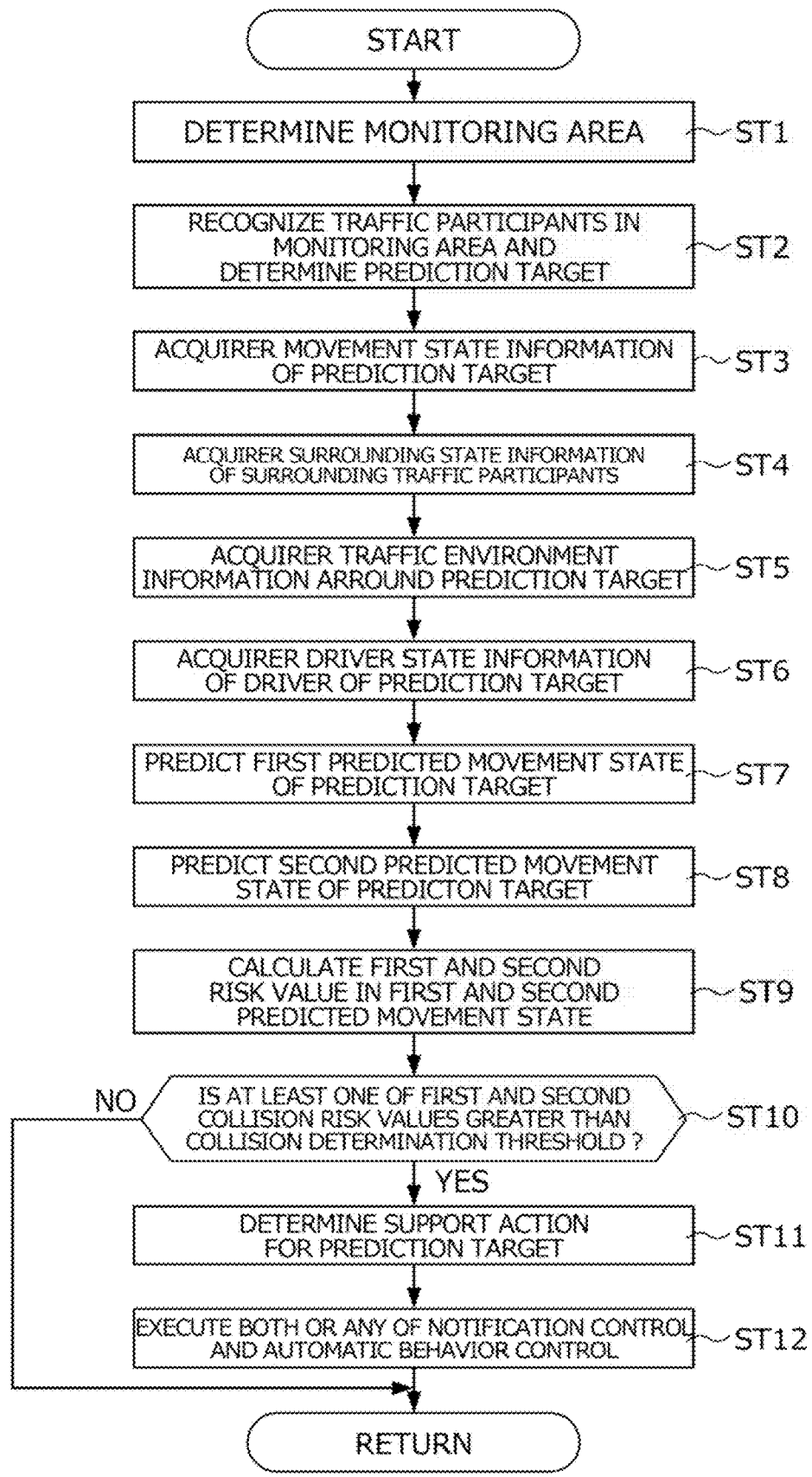
FIG. 10 is a flowchart illustrating specific procedure of traffic safety support processing by a traffic management server.

FIG. 10 is a flowchart illustrating specific procedure of traffic safety support processing for supporting safe traffic of the traffic participants in the target traffic area by the traffic management server 6. Each step indicated in the flowchart in FIG. 10 is implemented by a computer program stored in a storage medium which is not illustrated being executed by the traffic management server 6.

First, in step ST1, the traffic management server 6 determines the monitoring area among the target traffic area, and the processing transitions to step ST2. In step ST2, the traffic management server 6 recognizes a plurality of traffic participants existing in the monitoring area and further determines a prediction target among the plurality of traffic participants, and the processing transitions to step ST3.

In step ST3, the traffic management server 6 acquires movement state information of the prediction target, and the processing transitions to step ST4. In step ST4, the traffic management server 6 acquires surrounding state information of the traffic participants around the prediction target in the monitoring area, and the processing transitions to step ST5. In step ST5, the traffic management server 6 acquires traffic environment information of the surroundings of the prediction target in the monitoring area, and the processing transitions to step ST6. In step ST6, the traffic management server 6 acquires driver state information regarding a state of confirmation of surroundings by the driver of the prediction target, and the processing transitions to step ST7.

In step ST7, the traffic management server 6 predicts a first predicted movement state of the prediction target on the basis of the movement state information, the surrounding state information, and the traffic environment information, and the processing transitions to step ST8. In step ST8, the traffic management server 6 predicts a second predicted movement state of the prediction target on the basis of the movement state information, the surrounding state information, the traffic environment information, and the driver state information, and the processing transitions to step ST9. As described above, in step ST8, the traffic management server 6 generates a risk map for the prediction target on the basis of the movement state information, the surrounding state information, and the traffic environment information, generates a recognition state estimation map by correcting the risk map on the basis of the driver state information, and further predicts a second predicted movement state of the prediction target on the basis of the recognition state estimation map.

In step ST9, the traffic management server 6 calculates a first collision risk value between the prediction target and surrounding traffic participants in the first predicted movement state and a second collision risk value between the prediction target and surrounding movement state by using the risk map of the prediction target, and the processing transitions to step ST10.

In step 10, the traffic management server 6 determines whether at least any of the first and second collision risk values are greater than the collision determination threshold. If the determination result in step ST10 is NO, the traffic management server 6 returns to step ST1; if the determination result is YES, the traffic management server 6 proceeds to step ST11.

In step ST11, the traffic management server 6 determines support action for the prediction target, and the processing transitions to step ST12. In step ST12, the traffic management server 6 executes as support control both or any of notification control in which the on-board notification device 22, 32 of the prediction target is operated so that the prediction target performs the support action and automatic behavior control in which the on-board driving support device 21, 31 of the prediction target is operated so that the prediction target performs the support action, and the processing returns to step ST1.

Second Embodiment

Next, a traffic safety support system according to a second embodiment of the present invention will be described with reference to the drawings. The traffic safety support system according to this embodiment differs from the traffic safety support system 1 according to the first embodiment in configuration of the predictor of the traffic management server. In the following description of the traffic safety support system according to this embodiment, the same sign will be used for the same configuration as that of the traffic safety support system 1 according to the first embodiment, and detailed explanation will be omitted.

Figure 11:
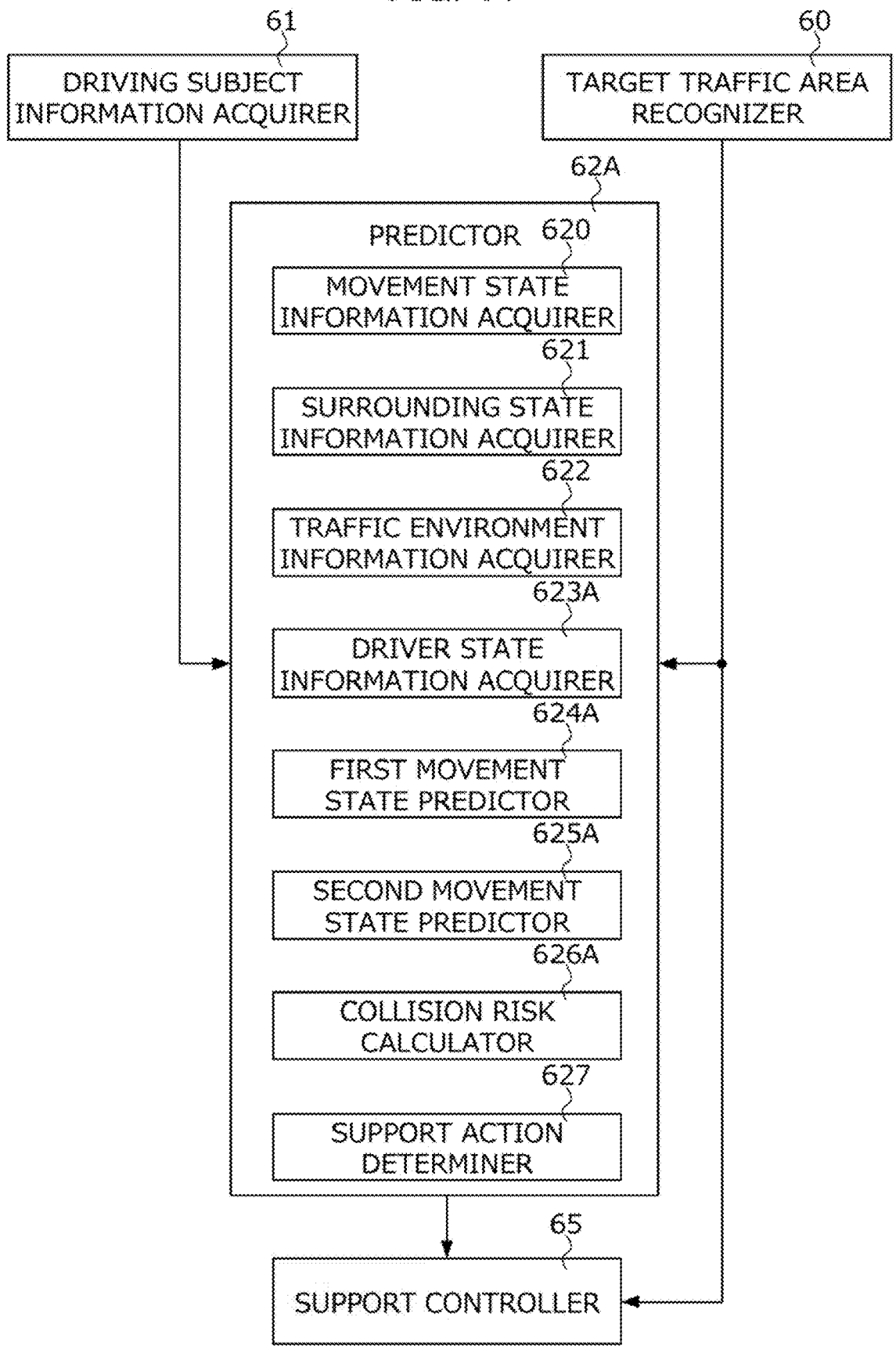
FIG. 11 is a functional block diagram illustrating a specific configuration of a predictor of a traffic safety support system according to a second embodiment of the present invention.

FIG. 11 is a functional block diagram illustrating a specific configuration of the predictor 62A according to this embodiment. As shown in FIG. 11, the predictor 62A according to this embodiment differs from the predictor 62 according to the first embodiment shown in FIG. 3 in configuration of a driver state information acquirer 623A, a first movement state predictor 624A, a second movement state predictor 625A, and a collision risk calculator 626A.

The driver state information acquirer 623A acquires driver state information regarding a state of a driver of the prediction target on the basis of the driving subject state information transmitted from the driving subject information acquirer 61. In this embodiment, the driver state information refers to information correlated with driving capability of the driver at that time, and more specifically refers to information in which an emotion state and a physical condition of the driver at that time are reflected. While in the present embodiment, a case will be described where an impatience parameter value representing quantification of an impatience degree of the driver is defined as the driver state information, the present invention is not limited to this.

Further, while in the present embodiment, a case will be described where the impatience parameter value may take any one of three values including a value 0 indicating that the driver is in the normal state, a value 1 indicating that the driver is in a slightly impatient state, and a value 2 indicating that the driver is in a strongly impatient state, the present invention is not limited to this.

The driving subject information acquired by the driving subject information acquirer 61 as described above includes face image data of the driver of the prediction target, time-series data such as biological information of the driver of the prediction target, and schedule information of the driver. Thus, the driver state information acquirer 623A calculates the impatience parameter value indicating the impatience degree of the driver at that time on the basis of the face image data, the time-series data such as biological information, schedule information and the like.

The first movement state predictor 624A predicts a first predicted movement state, which is a movement state of the prediction target in the monitoring area up to a predetermined prediction period ahead, on the basis of the movement state information, the surrounding state information, and the traffic environment information. In other words, the first movement state predictor 624A calculates a predicted traveling path to the predicted period ahead of the prediction target as a parameter characterizing the first predicted movement state of the prediction target and a moving speed profile. Hereinafter, the predicted traveling path calculated by the first movement state predictor 624A is also referred to as a "first predicted traveling path", and the moving speed profile calculated by the first movement state predictor 624A is also referred to as a "first predicted moving speed profile". The procedure for predicting the first predicted movement state by the first movement state predictor 624A is the same as the procedure for predicting the first predicted movement state by the first movement state predictor 624 in the first embodiment, thus a detailed description is omitted.

The second movement state predictor 625A predicts a second movement state, which is a movement state of the prediction target in the monitoring area up to the predicted period ahead on the basis of the movement state information, the surrounding state information, the traffic environment information, and the driver state information. In other words, the second movement state predictor 625A calculates a predicted traveling path and a moving speed profile of the prediction target from a current time point to the predicted period ahead as the second predicted traveling path and the second predicted moving speed profile, respectively, as parameters characterizing the second predicted movement state of the prediction target In the following, a specific procedure for calculating the second predicted traveling path and the second predicted moving speed profile in the second movement state predictor 625A will be described with reference to FIGS. 12 to 13.

Figure 12:
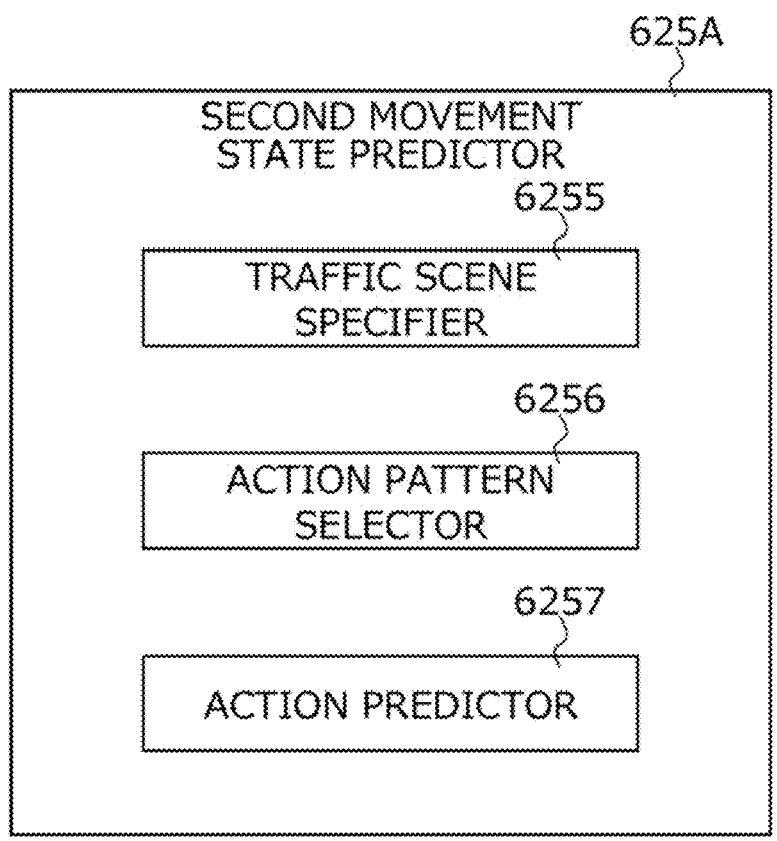
FIG. 12 is a functional block diagram illustrating a specific configuration of a second movement state predictor.

FIG. 12 is a functional block diagram illustrating a specific configuration of the second movement state predictor 625A. The second movement state predictor 625A, which includes a traffic scene specifier 6255, an action pattern selector 6256, and an action predictor 6257, calculates a second predicted traveling path and a second moving speed profile of the prediction target by using these.

The traffic scene specifier 6255 specifies a traffic scene of the prediction target in the monitoring area on the basis of the movement state information, the surrounding state information, and the traffic environment information. More specifically, the traffic scene specifier 6255 specifies a traffic scene of the prediction target by determining values of a plurality of traffic scene parameters characterizing a traffic scene of the prediction target on the basis of the movement state information, the surrounding state information, and the traffic environment information.

Here, examples of the traffic scene parameters include the number of lanes of a traveling road, types of the lanes, widths of the lanes, a position of the lane on which the prediction target exists, the legal speed limit of the traveling road, a speed range of the prediction target, whether or not a preceding vehicle of the prediction target is traveling, a speed range of the preceding vehicle, a distance between the preceding vehicle and the prediction target, a vehicle rank of the preceding vehicle, whether or not a following vehicle of the prediction target is traveling, a speed range of the following vehicle, a distance between the following vehicle and the prediction target, a vehicle rank of the following vehicle, whether or not a right-side parallel traveling vehicle exists on the right side of the prediction target, a speed range of the right-side parallel traveling vehicle, a distance between the right-side parallel traveling vehicle and the prediction target, a vehicle rank of the right-side parallel traveling vehicle, whether or not a left-side parallel traveling vehicle exists on the left side of the prediction target, a speed range of the left-side parallel traveling vehicle, a distance between the left-side parallel traveling vehicle and the prediction target, a vehicle rank of the left-side parallel traveling vehicle, whether or not a traffic light exists in front of the prediction target, a color of the traffic light, and a distance to the traffic light.

The action pattern selector 6256 selects, as a predicted action pattern, at least one from among a plurality of predetermined action patterns on the basis of the driver state information acquired by the driver state information acquirer 623A and the traffic scene specified by the traffic scene specifier 6255. Here, the action pattern selector 625 previously determines, as a plurality of action patterns, constant speed action of maintaining the current speed, a deceleration action of decreasing the speed than the current speed, stop action of stopping the prediction target, acceleration action of increasing the speed than the current speed, preceding vehicle following action of following the preceding vehicle, left-side parallel traveling vehicle following action of following the left-side parallel traveling vehicle, right-side parallel traveling vehicle following action of following the right-side parallel traveling vehicle, right-side lane change action of changing the travel lane to the right lane, left-side lane change action of changing the travel lane to the left lane, right-side cutting-in action of cutting-in between the preceding vehicle and the right-side parallel traveling vehicle, left-side cutting-in action of cutting-in between the preceding vehicle and the left-side parallel traveling vehicle, right-side overtaking action of overtaking the preceding vehicle from the right side, left-side overtaking action of overtaking the preceding vehicle from the left side, and a combination action of these actions, and the like.

The action pattern selector 6256 selects at least one as predicted action pattern from among the plurality of action patterns by using an action pattern prediction model that outputs at least one action pattern selected from the above-described plurality of action patterns when input data generated on the basis of the driver state information and traffic scene with respect to the prediction target is input, for example. The action pattern prediction model associates the driver state information and traffic scene with respect to the prediction target with the predicted action pattern believed to be more likely to be taken by this prediction target in the near future. In other words, the action pattern selector 6256 sets, as the predicted action pattern, an output of the action pattern prediction model when the input data generated on the basis of the driver state information and the traffic scene is input to the action pattern prediction model. Here, the action pattern selector 6256 uses, as the action pattern prediction model, a deep neural network (DNN) constructed for each prediction target by machine learning using the data acquired from the prediction target.

In such an action pattern prediction model, a DNN constructed by repeatedly performing a learning method described below for each prediction target is used. The learning method includes the steps of generating input data to the action pattern prediction model on the basis of the traffic scene and the driver state information acquired in a predetermined first time period, generating correct answer data to an output of the action pattern prediction model on the basis of the movement state information acquired in a second time period immediately after the first time period, and learning the action pattern prediction model using learning data obtained by combining the input data and the correct answer data.

As described above, in the present embodiment, a case has been described where the action pattern selector 6256 selects a predicted action pattern by using the action pattern prediction model, but the present invention is not limited to this. The action pattern selector 6256 may select at least one predicted action pattern prediction model from among the plurality of action patterns by using a table that associates the driver state information and the traffic scene with respect to the prediction target with the predicted action pattern believed to be more likely to be taken by this prediction target in the near future.

Here, specific procedure for selecting a predicted action pattern from among the plurality of action patterns by the action pattern selector 6256 will be described with reference to FIG. 13.

Figure 13:
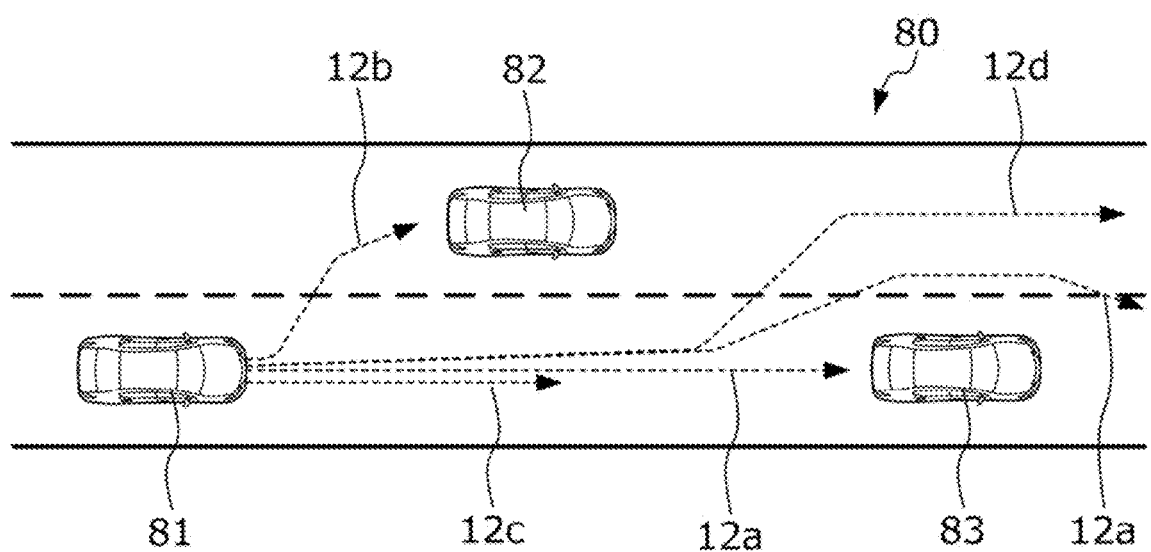
FIG. 13 is a view illustrating an example of a monitoring area.

FIG. 13 is a view illustrating an example of a monitoring area 80. FIG. 13 illustrates a case where traffic participants 81, 82, and 83 which are three four-wheeled vehicles are traveling in the monitoring area 80 which is a straight road with two lanes on each side. In the following description, a case will be described where the action pattern selector 6256 selects, when the first traffic participant 81 among the traffic participants 81 to 83 is defined as a prediction target, a predicted action pattern of the prediction target from among the plurality of action patterns.

As illustrated in FIG. 13, at a time point at which a predicted action pattern of the prediction target is selected by the action pattern selector 6256, the third traffic participant 83 and the first traffic participant 81 are traveling on the lane on the right side in order from the top, with a predetermined distance left between the vehicles, and the second traffic participant 82 is traveling on the lane on the left side and slightly ahead the first traffic participant 81 and slightly behind the third traffic participant 83. Thus, the third traffic participant 83 is a preceding vehicle as viewed from the prediction target, and the second traffic participant 82 is a left-side parallel traveling vehicle as viewed from the prediction target. The above-described traffic scene specifier 6255 specifies a traffic scene in which the prediction target is placed by determining values of a plurality of traffic scene parameters such as the number of lanes of a road on which the prediction target is traveling, and whether or not the preceding vehicle is traveling.

In the action pattern selector 6256, a plurality of action patterns that may be taken by the first traffic participant 81 as the prediction target during the period from the state illustrated in FIG. 13 to the predetermined period ahead are defined. For example, a dashed-line arrow 12a indicates a traveling path of the prediction target associated with the "preceding vehicle following action", a dashed-line arrow 12b indicates a traveling path of the prediction target associated with the "left-side parallel traveling vehicle following action", a dashed-line arrow 12c indicates a traveling path of the prediction target associated with the "deceleration action", a dashed-line arrow 12d indicates a traveling path of the prediction target associated with the "left-side cutting-in action", and a dashed-line arrow 12e indicates a traveling path of the prediction target associated with the "left-side overtaking action".

The action pattern selector 6256 selects, as a predicted action pattern, at least one from among a plurality of predetermined action patterns as illustrated in FIG. 13 on the basis of the traffic scene specified by the traffic scene specifier 6255 (that is, values of the traffic scene parameters), and the driver state information acquired by the driver state information acquirer 623A (that is, the impatience parameter value). More specifically, under the traffic scene as illustrated in FIG. 13, in a case where the impatience parameter value for the driver of the prediction target is 0, the action pattern selector 6256 selects, as the predicted action pattern, the "deceleration action" associated with the dashed-line arrow 12c. In contrast, under the traffic scene as illustrated in FIG. 13, in a case where the impatience parameter value for the driver of the prediction target is 2, the action pattern selector 6256 selects, as the predicted action pattern, the "left-side cutting-in action" associated with the dashed-line arrow 12d. The action pattern selector 6256 selects the predicted action pattern corresponding to the state of the driver of the prediction target at that time by using the action pattern prediction model constructed on the basis of the data acquired from the prediction target in the past.

Returning to FIG. 12, the action predictor 6257 calculates a second predicted traveling path and a second moving speed profile from a current time point to the predetermined period ahead of the prediction target on the basis of the movement state information, the surrounding state information, the traffic environment information, the predicted action pattern selected by the action pattern selector 6256, and the like.

Returning to FIG. 11, the collision risk calculator 626A calculates, on the basis of the movement state information, the surrounding state information, and traffic environment information, a first collision risk value indicating a collision risk between the prediction target and the surrounding traffic participants in the first predicted movement state and a second collision risk value indicating a collision risk between the prediction target and the surrounding traffic participants in the second predicted movement state.

More specifically, the collision risk calculator 626A generates a first risk map according to the first predicted traveling path calculated by the first movement state predictor 624A and a second risk map according to the second predicted traveling path calculated by the second movement state predictor 625A by the same procedure as the risk map generator 6251 in the first embodiment. In addition, the collision risk calculator 626A calculates a first collision risk value by searching the first risk map on the basis of the first predicted moving speed profile calculated by the first movement state predictor 624A, and a second collision risk value by searching the second risk map on the basis of the second predicted moving speed profile calculated by the second movement state predictor 625A.

Figure 14:
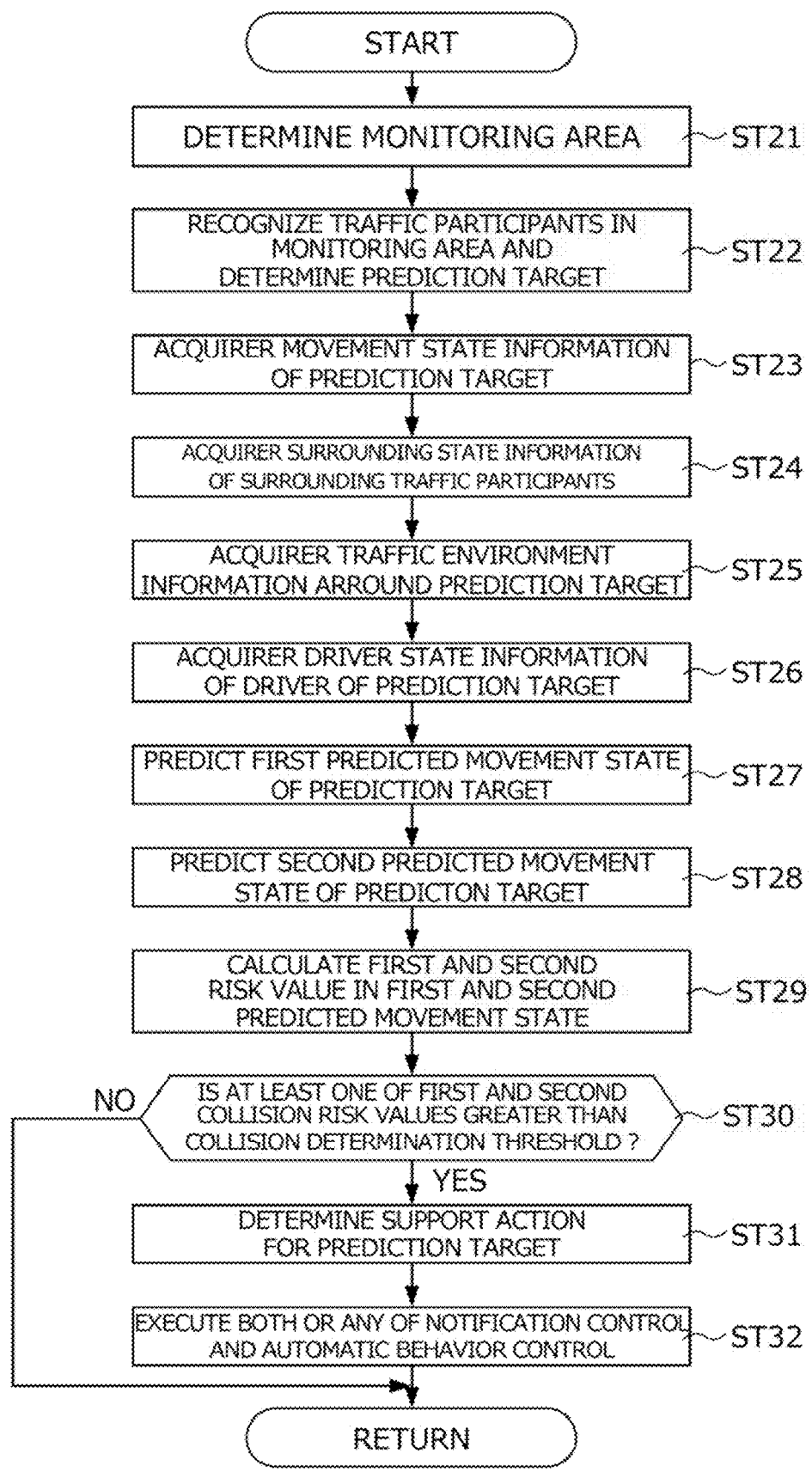
FIG. 14 is a flowchart illustrating specific procedure of traffic safety support processing by a traffic management server.

FIG. 14 is a flowchart illustrating specific procedure of traffic safety support processing for supporting safe traffic of the traffic participants in the target traffic area by the traffic management server. Each step indicated in the flowchart in FIG. 14 is implemented by a computer program stored in a storage medium which is not illustrated being executed by the traffic management server 6. The processing of steps ST21 to ST27 and ST30 to ST32 in the flowchart shown in FIG. 14 is the same as that of steps ST1 to ST7 and ST10 to ST12 in the flowchart shown in FIG. 10, thus detailed explanation is omitted.

In step ST28, the traffic management server predicts a second predicted movement state of the prediction target on the basis of the movement state information, the surrounding state information, the traffic environment information, and the driver state information, and the processing transitions to step ST29. As described above, in step ST28, the traffic management server, after specifying the traffic scene for prediction target on the basis of the movement state information, the surrounding state information, and the traffic environment information, selects at least one from among a plurality of predetermined action patterns as a predicted action pattern on the basis of the driver state information and the specified traffic scene. In addition, the traffic management server predicts a second predicted movement state of the prediction target on the basis of the selected predicted action pattern.

In step ST29, the traffic management server calculates a first collision risk value between the prediction target and surrounding traffic participants in the first predicted movement state and a second collision risk value between the prediction target and surrounding movement state by using the first risk map according to the first predicted traveling path and the second risk map according to the second predicted traveling path, and the processing transitions to step ST30.

While first and second embodiments of the present invention has been described above, the present invention is not limited to this. Detailed configurations may be changed as appropriate within a scope of gist of the present invention. For example, in the above-described embodiment, a case has been described where the predictor that predicts the future of the prediction target which is a moving body in the monitoring area is provided in the traffic management server connected so as to be able to perform communication with the prediction target, but the present invention is not limited to this. The predictor may include on-board devices moving along with the support target. In this case, although the information amount of the movement state information, the surrounding state information, the traffic environment information and the like that can be acquired by the predictor is smaller than the information amount that can be acquired by the traffic management server, there is an advantage that the delay through the communication is small.

EXPLANATION OF REFERENCE NUMERALS

1 Traffic safety support system
2 Four-wheeled vehicle (moving body, traffic participant)
20 On-board devices
21 On-board driving support device
22 On-board notification device
3 Motorcycle (moving body, traffic participant)
30 On-board devices
31 On-board driving support device
32 On-board notification device
6 Traffic management server
60 Target traffic area recognizer
61 Driving subject information acquirer
62, 62A Predictor
620 Movement state information acquirer
621 Surrounding state information acquirer
622 Traffic environment information acquirer
623, 623A Driver state information acquirer
624, 624A First movement state predictor
625, 625A Second movement state predictor
6251 Risk map generator
6252 Recognition state estimation map generator
6253 Moving speed profile calculator
6255 Traffic scene specifier
6256 Action pattern selector
6257 Action predictor
626, 626A Collision risk calculator
627 Support action determiner
65 Support controller
9 Target traffic area
90 Monitoring area
91 First traffic participant
92 Second traffic participant
93 Third traffic participant

What is claimed is:

1. A traffic safety support system supporting, when a moving body moving in a traffic area is defined, as a prediction target, safe traffic of the prediction target in the traffic area, comprising:
   a movement state information acquirer configured to acquire movement state information regarding a movement state of the prediction target;
   a surrounding state information acquirer configured to acquire surrounding state information regarding movement states of surrounding traffic participants around the prediction target in the traffic area;
   a driver state information acquirer configured to acquire driver state information regarding a state of a driver of the prediction target;
   a first movement state predictor configured to predict a first predicted movement state of the prediction target including a first predicted moving speed profile along a predicted traveling path from a current time to a predicted period ahead on a basis of the movement state information and the surrounding state information;
   a second movement state predictor configured to predict a second predicted movement state of the prediction target including a second predicted moving speed profile along the predicted traveling path from the current time to the predicted period ahead on the basis of the driver state information, and the surrounding state information, using an algorithm different from that of the first movement state predictor;
   a collision risk calculator configured to calculate a first collision risk value between the prediction target and the surrounding participants in the first predicted movement state and a second collision risk value between the prediction target and the surrounding participants in the second predicted movement state on the basis of the surrounding state information; and
   a support controller configured to execute support control for the prediction target in a case where at least one of the first collision risk value and the second collision risk value is greater than a predetermined threshold value, and
   wherein the support controller
   executes the support control to cause the prediction target to perform a first avoidance action to achieve the first predicted movement state when the first collision risk value is less than or equal to the threshold value and the second collision risk value is greater than the threshold value, executes the support control to cause the prediction target to perform a second avoidance action to achieve the second predicted movement state when the second collision risk value is less than or equal to the threshold value and the first collision risk value is greater than the threshold value, and executes the support control to cause the prediction target to perform a collision avoidance action to avoid a collision with the surrounding traffic participants or a collision damage reduction action to reduce damage from the collision when both the first collision risk value and the second collision risk value are greater than the threshold value.

2. The traffic safety support system according to claim 1, wherein the collision risk calculator calculates the first collision risk value by searching a risk map that relates moving speed of the prediction target to a collision risk value of the prediction target in a future, on the basis of the first predicted moving speed profile, and calculates the second collision risk value by searching the risk map on the basis of the second predicted moving speed profile.

3. The traffic safety support system according to claim 2, comprising:

on-board devices that move along with the prediction target; and a traffic management server capable of communicating with the on-board devices, wherein the traffic management server includes the movement state information acquirer, the surrounding state information acquirer, the driver state information acquirer, the first movement state predictor, the second movement state predictor, the collision risk calculator, and the support controller, the on-board devices include a human machine interface configured to notify the driver of information through at least one of driver's auditory sense, visual sense, and haptic sense, and the support controller executes, as the support control, notification control that notifies the driver of information to avoid the collision of the prediction target or to reduce damage from the collision by operating the human machine interface.

4. The traffic safety support system according to claim 3, wherein the support controller, in the notification control, notifies the driver of information to encourage acceleration or deceleration in accordance with the first avoidance action, the second avoidance action, the collision avoidance action, or the collision damage reduction action.

5. The traffic safety support system according to claim 4, wherein the support controller, in the notification control, displays an image generated by plotting a moving speed profile on the risk map according to the first avoidance action, the second avoidance action, the collision avoidance action, or the collision damage reduction action on the human machine interface.

6. The traffic safety support system according to claim 5, wherein the support controller displays the risk map on the human machine interface by highlighting areas on the risk map where the collision risk value is greater than the threshold value.

7. The traffic safety support system according to claim 1, wherein the driver state information acquirer acquires information regarding a surrounding confirmation state of the driver as the driver state information, and the second movement state predictor predicts the second predicted movement state on the basis of the movement state information, the surrounding state information, and the driver state information.

8. The traffic safety support system according to claim 1, comprising a traffic environment information acquirer configured to acquire traffic environment information around the prediction target in the traffic area, wherein the second movement state predictor includes:

a traffic scene specifier configured to specify a traffic scene of the prediction target on a basis of the movement state information, the surrounding state information, and the traffic environment information;

an action pattern selector configured to select, as a predicted action pattern, at least one from among a plurality of predetermined action patterns on the basis of the traffic scene and the driver state information; and an action predictor configured to predict the second predicted movement state on the basis of the predicted action pattern.

9. The traffic safety support system according to claim 1, comprising:

on-board devices that move along with the prediction target; and a traffic management server capable of communicating with the on-board devices, wherein the traffic management server includes the movement state information acquirer, the surrounding state information acquirer, the driver state information acquirer, the first movement state predictor, the second movement state predictor, the collision risk calculator, and the support controller, the on-board devices include an on-board driving support device configured to automatically control behavior of the prediction target, and the support controller executes, as the support control, automatic behavior control that operates the on-board driving support device to avoid a collision of the prediction target or to reduce damage from the collision.

10. A non-transitory computer-readable storage medium storing a computer program for a computer that predicts, when a moving body moving in a traffic area is defined as a prediction target, a future of the prediction target in the traffic area, the computer program comprising the steps of:

acquiring movement state information regarding a movement state of the prediction target;

acquiring surrounding state information regarding movement states of traffic participants around the prediction target in the traffic area;

acquiring driver state information regarding a state of a driver of the prediction target;

predicting a first predicted movement state of the prediction target including a first predicted moving speed profile along a predicted traveling path from a current time to a predicted period ahead on a basis of the movement state information and the surrounding state information;

predicting a second predicted movement state of the prediction target including a second predicted moving speed profile along the predicted traveling path from the current time to the predicted period ahead on the basis of the driver state information, and the surrounding state information, using an algorithm different from an algorithm for predicting the first predicted movement state;

calculating a first collision risk value between the prediction target and the surrounding participants in the first predicted movement state and a second collision risk value between the prediction target and the surrounding participants in the second predicted movement state on the basis of the surrounding state information;

executing support control to cause the prediction target to perform a first avoidance action to achieve the first predicted movement state when the first collision risk value is less than or equal to a predetermined threshold value and the second collision risk value is greater than the threshold value;

executing the support control to cause the prediction target to perform a second avoidance action to achieve the second predicted movement state when the second collision risk value is less than or equal to the threshold value and the first collision risk value is greater than the threshold value; and executing the support control to cause the prediction target to perform a collision avoidance action to avoid a collision with the surrounding traffic participants or a collision damage reduction action to reduce damage from the collision when both the first collision risk value and the second collision risk value are greater than the threshold value.

* * * * *